(12) United States Patent
Liu et al.

(10) Patent No.: US 12,395,537 B2
(45) Date of Patent: Aug. 19, 2025

(54) AUGMENTED REALITY COMMUNICATION METHOD, APPARATUS, AND SYSTEM

(71) Applicant: Huawei Technologies Co., Ltd., Shenzhen (CN)

(72) Inventors: Yan Liu, Shenzhen (CN); Yang Gao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/474,721

(22) Filed: Sep. 26, 2023

(65) Prior Publication Data

US 2024/0022619 A1 Jan. 18, 2024

Related U.S. Application Data

(63) Continuation of application No. PCT/CN2022/083191, filed on Mar. 25, 2022.

(30) Foreign Application Priority Data

Mar. 27, 2021 (CN) .......................... 202110329252.9

(51) Int. Cl.
*G06F 15/16* (2006.01)
*H04L 65/1016* (2022.01)
*H04L 65/60* (2022.01)
*H04L 67/131* (2022.01)

(52) U.S. Cl.
CPC .......... *H04L 65/60* (2013.01); *H04L 65/1016* (2013.01); *H04L 67/131* (2022.05)

(58) Field of Classification Search
CPC .... H04L 65/60; H04L 65/1016; H04L 67/131
See application file for complete search history.

(56) References Cited

U.S. PATENT DOCUMENTS

| 2011/0221962 A1 | 9/2011 | Khosravy et al. |
| 2015/0029296 A1* | 1/2015 | Ni ......................... H04N 7/148 348/14.01 |
| 2023/0007706 A1* | 1/2023 | Dahlqvist ............... H04L 67/51 |

FOREIGN PATENT DOCUMENTS

| CN | 104185220 A | 12/2014 |
| CN | 106803921 A | 6/2017 |
| CN | 110324284 A | 10/2019 |
| CN | 112788274 A | 5/2021 |
| JP | 2011526441 A | 10/2011 |

(Continued)

OTHER PUBLICATIONS

3GPP TR 26.928 V16.1.0 (Dec. 2020),"3rd Generation Partnership Project; Technical Specification Group Services and System Aspects; Extended Reality (XR) in 5G (Release 16)", total 130 pages.

(Continued)

*Primary Examiner* — Padma Mundur
(74) *Attorney, Agent, or Firm* — Slater Matsil, LLP

(57) ABSTRACT

An augmented reality communication method in which AR is integrated into voice and video calls is disclosed. An auxiliary data channel and a media stream channel are established between a terminal device and an AR media processing network element. In addition, AR auxiliary data and a media stream have a same transmission path. The AR media processing network element may be an IMS access gateway having an AR processing capability or a media resource function MRF.

21 Claims, 23 Drawing Sheets

(56) References Cited

FOREIGN PATENT DOCUMENTS

| JP | 2014525699 A | 9/2014 |
|---|---|---|
| JP | 2018509113 A | 3/2018 |
| WO | 2019017885 A1 | 1/2019 |
| WO | 2021025430 A1 | 2/2021 |

OTHER PUBLICATIONS

3GPP TS 22.173 V17.2.0 (Dec. 2020), "3rd Generation Partnership Project; Technical Specification Group Services and System Aspects;IP Multimedia Core Network Subsystem (IMS) Multimedia Telephony Service and supplementary services;Stage 1 (Release 17)", total 77 pages.

3GPP TS 23.334 V16.2.0 (Dec. 2020),"3rd Generation Partnership Project; Technical Specification Group Core Network and Terminals; IP Multimedia Subsystem (IMS) Application Level Gateway (IMS-ALG)-IMS Access Gateway (IMS-AGW) interface:Procedures descriptions (Release 16)",total 109 pages.

3GPP TS 26.114 V16.8.2 (Jan. 2021), "3rd Generation Partnership Project; Technical Specification Group Services and System Aspects; IP Multimedia Subsystem (IMS); Multimedia Telephony; Media handling and interaction(Release 16)", total 71 pages.

"The relationship between wireless signal transmission attenuation and distance [Indoor positioning]_Beidou GPS Navigation", Sina Blog, UPL:https://blog.sina.com.cn/s/blog_c253baf70102zndw.html, Mar. 27, 2019, with the English translation, total 6 pages.

Huawei, "FS_5GSTAR: Proposed Architectures for AR Conversational", 3GPP TSG SA4 Meeting #110-e Online meeting, Aug. 19-28, 2020, S4-201066, total 4 pages.

\* cited by examiner

AUGMENTED REALITY COMMUNICATION METHOD, APPARATUS, AND SYSTEM

CROSS-REFERENCE TO RELATED APPLICATIONS

This application is a continuation of International Application No. PCT/CN2022/083191, filed on Mar. 25, 2022, which claims priority to Chinese Patent Application No. 202110329252.9, filed on Mar. 27, 2021. The disclosures of the aforementioned applications are hereby incorporated by reference in their entireties.

TECHNICAL FIELD

Embodiments of this application relate to the field of communication technologies, and in particular, to an augmented reality communication method, apparatus, and system.

BACKGROUND

Constructed on a 4th generation (4G) network, voice over long term evolution (VoLTE) is an end-to-end voice solution under an all-IP condition. During communication between users, VoLTE offers shorter call connection time and higher voice and video call quality. Augmented reality (AR) is a technology that cleverly integrates virtual information with the real world. A plurality of technical means such as multimedia, three-dimensional modeling, real-time tracking and registration, intelligent interaction, and sensing are widely used to simulate virtual information such as a text, an image, a three-dimensional model, music, and a video that are generated by a computer. Then, simulated information is applied to the real world, and the two types of information complement each other, to implement "augmentation" of the real world. The augmented reality technology can not only effectively reflect content of the real world, but also display content of the virtual information content. Currently, there is no effective implementation in which AR is integrated into voice and video calls.

SUMMARY

Embodiments of this application provide an augmented reality communication method, apparatus, and system, to provide an implementation in which AR is integrated into voice and video calls, thereby improving user experience.

According to a first aspect, an embodiment of this application provides an augmented reality AR communication system, including an internet protocol multimedia subsystem IMS core network element and a first AR media processing network element. The IMS core network element is configured to control the establishing of a first media stream channel between the first AR media processing network element and a first terminal device and an auxiliary data channel between the first AR media processing network element and the first terminal device. The first AR media processing network element is configured to: receive first AR auxiliary data from the first terminal device through the established auxiliary data channel, and receive a first media stream for AR communication between the first terminal device and a second terminal device through the established media stream channel. The first AR media processing network element is further configured to: perform augmented processing on the media stream based on the first AR auxiliary data to obtain a first AR media stream, and send the first AR media stream to the first terminal device through the media stream channel. According to the foregoing solution, the auxiliary data channel and the media stream channel are established between the terminal device and the AR media processing network element, so that AR is effectively integrated into voice and video calls. In addition, the AR auxiliary data and the media stream have a same transmission path, so that a latency can be reduced.

In a possible design, the first AR media processing network element may be an IMS access gateway having an AR processing capability or a media resource function MRF. For example, when point-to-point communication is performed between the terminal devices, the first AR media processing network element may be an IMS access gateway. For another example, when the terminal device performs an AR conference, the first AR media processing network element may be the MRF.

In a possible design, the first AR media processing network element is located in an IMS network to which the first terminal device belongs (or in which the first terminal device is located). The AR media processing network element in the IMS network in which the first terminal device is located has the AR processing capability, and the AR media processing network element in the IMS network in which the first terminal device is located performs augmented processing according to a proximity principle, so that a latency can be further reduced.

In a possible design, the system further includes a second AR media processing network element located in an IMS network to which the second terminal device belongs (or in which the second terminal device is located). The first AR media processing network element is further configured to send the AR media stream to the second AR media processing network element. The second AR media processing network element is configured to: receive the AR media stream sent by the first AR media processing network element, and send the AR media stream to the second terminal device.

In a possible design, the first AR media processing network element is located in an IMS network to which the second terminal device belongs (or in which the second terminal device is located), the system further includes a third AR media processing network element located in an IMS network to which the first terminal device belongs (or in which the first terminal device is located), the third AR media processing network element does not have the AR processing capability, and the media stream channel between the first AR media processing network element and the first terminal device includes a first media stream channel between the first AR media processing network element and the third AR media processing network element and a second media stream channel between the third AR media processing network element and the first terminal device.

The third AR media processing network element is configured to: receive the media stream from the first terminal device through the second media stream channel, and forward the media stream to the first AR media processing network element through the first media stream channel; and receive an AR media stream from the first AR media processing network element through the first media stream channel, and send the AR media stream to the first terminal device through the second media stream channel.

In the foregoing design, when the AR media processing network element in the IMS network in which the first terminal device is located does not have the AR processing capability, the AR media processing network element in the IMS network in which the second terminal device is located is configured to provide an augmented processing function for the first terminal device. A feasible solution is provided for integrating AR into voice and video calls.

In a possible design, the first AR media processing network element is further configured to receive target object information from the first terminal device through the auxiliary data channel. The AR media processing network element is further configured to obtain, from a third-party server, a target object corresponding to the target object information.

In the foregoing design, the third-party server may provide a material of the target object for the AR communication between the terminal devices. In this application, the target object is obtained from the third-party server through the auxiliary data channel.

In a possible design, the target object is a virtual object or an identifier of a virtual object. The first AR media processing network element is further configured to send the virtual object or the identifier of the virtual object to the first terminal device through the auxiliary data channel. Because the virtual object is required in a plurality of scenarios, the virtual object is obtained from the third-party server through the auxiliary data channel in the foregoing design.

In a possible design, the target object information includes a virtual object type requested by the first terminal device, and the first AR media processing network element sends a plurality of virtual object identifiers of the virtual object type to the first terminal device through the auxiliary data channel.

In a possible design, after receiving the plurality of virtual object identifiers corresponding to the virtual objects, the first AR media processing network element stores correspondences between the virtual object types and the plurality of virtual object identifiers.

In a possible design, when receiving the virtual object type through the auxiliary data channel, the first AR media processing network element may first determine whether the first AR media processing network element stores the virtual object identifier corresponding to the virtual object type. If yes, the first AR media processing network element may not obtain, from the third-party server, the virtual object identifier corresponding to the virtual object type. If the first AR media processing network element does not store the virtual object identifier corresponding to the virtual object type, the first AR media processing network element obtains, from the third-party server, the virtual object identifier corresponding to the virtual object type. In this manner, unnecessary resource waste caused by the obtaining can be reduced.

In a possible design, the method further includes:

The first AR media processing network element receives a first virtual object identifier from the first terminal device through the auxiliary data channel, where the first virtual object identifier is for identifying a first virtual object selected by a user of the first terminal device from a plurality of virtual objects. The first AR media processing network element obtains the first virtual object corresponding to the first virtual object identifier from the third-party server, and sends the first virtual object to the first terminal device through the auxiliary data channel.

In a possible design, the target object is a real background object, and the first AR media processing network element is further configured to receive, through a media stream channel, a second media stream that is generated during the AR communication and that is sent by the first terminal device.

The first AR media processing network element is further configured to: render and synthesize the real background object and the second media stream to obtain a second AR media stream; and send the second AR media stream to the first terminal device through the media stream channel. In some application scenarios, a background picture corresponding to a foreground object is fixed. In this scenario, a rendering operation between the media stream and the background picture is performed by the AR media processing network element, so that pressure on uplink bandwidth of the terminal device can be reduced.

In a possible design, the system further includes an application server.

The application server is configured to: receive a first request message from the AR media processing network element, and forward the first request message to the third-party server; and receive a first response message from the third-party server, and forward the first response message to the first AR media processing network element.

In a possible design, the application server is configured with an address of the third-party server; and the application server is specifically configured to: forward the first request message to the third-party server based on the address of the third-party server, and forward the first response message to the first AR media processing network element.

In a possible design, the application server is further configured to send an address of the third-party server to the first AR media processing network element in a procedure of establishing the auxiliary data channel between the first terminal device and the first AR media processing network element.

According to a second aspect, an embodiment of this application provides an augmented reality AR communication method, including: An internet protocol multimedia subsystem IMS core network element receives a first request message from a first terminal device, where the first request message is for requesting for establishing of an auxiliary data channel, and the auxiliary data channel is for transmitting auxiliary data for AR communication between the first terminal device and an AR media processing network element. The IMS core network element controls the establishing of the auxiliary data channel between the AR media processing network element and the first terminal device. According to the foregoing solution, a simple and effective manner of creating the auxiliary data channel is provided, to obtain the AR auxiliary data for the AR communication through the auxiliary data channel, and perform augmented processing on a media stream for the AR communication during the AR communication.

In a possible design, that the IMS core network element controls the establishing of the auxiliary data channel between the AR media processing network element and the first terminal device includes: The IMS core network element sends a second request message to the AR media processing network element, where the second request message is for requesting for establishing of the auxiliary data channel between the AR media processing network element and the first terminal device. The IMS core network element receives a second response message sent by the AR media processing network element, where the second response message indicates to the IMS core network element that the AR media processing network element agrees upon the establishing of the auxiliary data channel. The IMS core network element sends a first response message to the first terminal device, where the first response message indicates to the first terminal device that the AR media processing network element is ready for establishing of the auxiliary data channel.

In a possible design, the AR media processing network element is an IMS access gateway having an AR processing capability or a media resource function MRF. For example, when point-to-point communication is performed between the terminal devices, the first AR media processing network element may be an IMS access gateway. For another example, when an AR conference is performed between the terminal devices, the first AR media processing network element may be an MRF.

In a possible design, the IMS core network element controls the establishing of a media stream channel between the AR media processing network element and the first terminal device. According to the foregoing solution, the auxiliary data channel and the media stream are established between the IMS core network element and the AR media processing network element, so that AR is effectively integrated into voice and video calls. In addition, the AR auxiliary data and the media stream have a same transmission path, so that a latency can be reduced.

In a possible design, the AR media processing network element is located in an IMS network to which the first terminal device belongs or is located in an IMS network to which a second terminal device belongs. The AR media processing network element in the IMS network in which the first terminal device is located has an AR processing capability, and the AR media processing network element in the IMS network in which the first terminal device is located performs augmented processing according to a proximity principle, so that a latency can be further reduced. When the AR media processing network element in the IMS network in which the first terminal device is located does not have the AR processing capability, the AR media processing network element in the IMS network in which the second terminal device is located is configured to provide an augmented processing function for the first terminal device. A feasible solution is provided for integrating AR into voice and video calls.

In a possible design, the first request message and the second request message carry a first description parameter that is of the first terminal device and that is for establishing the auxiliary data channel.

The first response message and the second response message carry a second description parameter that is of the AR media processing network element and that is for establishing the auxiliary data channel.

In a possible design, the method further includes: The IMS core network element sends a query request to the AR media processing network element, where the query request is for querying whether the AR media processing network element has an AR processing capability. The IMS core network element receives a query response sent by the AR media processing network element, where the query response carries information indicating that the AR media processing network element has the AR processing capability. In the foregoing design, a feasible and effective manner of determining whether the AR media processing network element has the AR processing capability is provided.

In a possible design, the AR media processing network element is located in an IMS network to which a second terminal device belongs, and the method further includes:

Before sending a query message to the AR media processing network element located in the IMS network to which the second terminal device belongs, the IMS core network element determines that the AR media processing network element that provides a service for the first terminal device does not have the AR processing capability.

In a possible design, a procedure of establishing AR communication between the first terminal device and the second terminal device is a procedure of establishing an AR session between the first terminal device and the second terminal device, a procedure of updating an AR session between the first terminal device and the second terminal device, or a procedure of re-establishing an AR session between the first terminal device and the second terminal device.

In a possible design, the first request message is a session initiation protocol SIP request INVITE message, or a SIP re-establishment request message, or a SIP update request message.

In a possible design, the method further includes: The IMS core network element controls the establishing of a media stream channel between the AR media processing network element and the first terminal device, where the media stream channel is for transmitting a media stream for transmitting content for AR communication between the first terminal device and the AR media processing network element.

In a possible design, a third request message from the first terminal device is received, where the third request message is further for requesting for establishing of the media stream channel. That the IMS core network element controls establishing of a media stream channel between the AR media processing network element and the first terminal device includes: The IMS core network element sends a fourth request message to the AR media processing network element, where the fourth request message is for requesting for establishing of the media stream channel between the AR media processing network element and the first terminal device. The IMS core network element receives a fourth response message sent by the AR media processing network element, where the fourth response message indicates to the IMS core network element that the AR media processing network element agrees upon the establishing of the media stream channel. The IMS core network element sends a third response message to the first terminal device, where the third response message indicates to the first terminal device that the AR media processing network element is ready for establishing of the media stream channel.

It is to be noted that the auxiliary data channel and the media stream channel may be established in a same procedure; or the media stream channel may be first established, and the auxiliary data channel is then established.

For example, the first request message and the third request message may be carried in a same message, the second request message and the fourth request message may be carried in a same message, the first response message and the third response message may be carried in a same message, and the second response message and the fourth response message may be carried in a same message.

According to a third aspect, an embodiment of this application provides an augmented reality AR communication method, including:

An auxiliary data channel is established between an AR media processing network element and a first terminal device under a trigger of the first terminal device.

In a possible design, a media stream channel for transmitting content for AR communication is established between the AR media processing network element and the first terminal device.

In a possible design, an AR media processing network element receives a second request message sent by an internet protocol multimedia subsystem IMS core network element, where the second request message is for requesting for establishing of an auxiliary data channel between the AR media processing network element and a first terminal device, and the auxiliary data channel is for transmitting auxiliary data for AR communication between the first terminal device and the AR media processing network element. The AR media processing network element sends a second response message to the IMS core network element, where the second response message indicates to the IMS core network element that the AR media processing network element agrees upon the establishing of the auxiliary data channel.

In a possible design, the method further includes: The AR media processing network element receives AR auxiliary data from the first terminal device through the auxiliary data channel after the establishment of the auxiliary data channel is completed.

In a possible design, the method further includes: The AR media processing network element receives a media stream for the AR communication from the first terminal device through the media stream channel. The AR media processing network element performs media augmented processing on the media stream for the AR communication based on the AR auxiliary data to obtain an AR media stream. The AR media processing network element sends the AR media stream obtained through augmented processing to the first terminal device through the media stream channel. According to the foregoing solution, the auxiliary data channel and the media stream are established between the terminal device and the AR media processing network element, so that AR is effectively integrated into voice and video calls. In addition, the AR auxiliary data and the media stream have a same transmission path, so that a latency can be reduced.

In a possible design, the method further includes: The AR media processing network element sends the AR media stream obtained through augmented processing to a second terminal device.

In a possible design, the AR auxiliary data includes one or more of operation data of a virtual model, annotation or tracking data of a target object, identification data of a facial expression or a body action, or pose data.

In a possible design, the AR media processing network element is an IMS access gateway having an AR processing capability or a media resource function MRF.

In a possible design, the AR media processing network element is located in an IMS network to which the first terminal device belongs (or in which the first terminal device is located) or is located in an IMS network to which the second terminal device belongs (or in which the second terminal device is located).

In a possible design, the second request message carries a first description parameter that is of the first terminal device and that is for establishing the auxiliary data channel, and the method further includes: The AR media processing network element determines, from the first description parameter, a second description parameter supported by the AR media processing network element, where the second response message carries the second description parameter.

According to a fourth aspect, an embodiment of this application provides an augmented reality AR communication method, including: A first terminal device sends a first request message to an IMS core network element, where the first request message is for requesting for establishing of an auxiliary data channel. The first terminal device receives a first response message sent by the IMS core network element, where the first response message indicates that the AR media processing network element completes the establishment of the auxiliary data channel, and the auxiliary data channel is for transmitting auxiliary data for AR communication between the first terminal device and the AR media processing network element.

In a possible design, the method further includes: establishing, between the first terminal device and the AR media processing network element, a media stream channel for transmitting content for the AR communication.

In a possible design, that a media stream channel for transmitting content for the AR communication is established between the first terminal device and the AR media processing network element includes:

The first terminal device sends a third request message to the IMS core network element, where the third request message is for requesting for establishing of the media stream channel.

The first terminal device receives a third response message sent by the IMS core network element, where the third response message indicates to the first terminal device that the AR media processing network element is ready for establishing of the media stream channel.

In a possible design, the first request message is further for requesting for establishing of a media stream channel. The first response message further indicates that the AR media processing network element is ready for establishing of the media stream channel.

In a possible design, the method further includes:

The first terminal device sends augmented reality AR auxiliary data to the AR media processing network element through the auxiliary data channel, and sends a media stream to the AR media processing network element through the media stream channel, where the media stream is generated during AR communication between the first terminal device and a second terminal device, where the AR auxiliary data is used by the AR media processing network element to perform media augmented processing on the media stream for the AR communication.

The first terminal device receives an AR media stream obtained through augmented processing from the AR media processing network element through the media stream channel.

In a possible design, the method further includes:

The first terminal device receives, through the media stream channel, an AR media stream that is of the second terminal device and that is sent by the AR media processing network element.

In a possible design, the first request message carries a first description parameter that is of the first terminal device and that is for establishing the auxiliary data channel.

The first response message carries a second description parameter that is of the AR media processing network element and that is for establishing the auxiliary data channel.

In a possible design, the AR media processing network element is located in an IMS network to which the first terminal device belongs (or in which the first terminal device is located) or is located in an IMS network to which the second terminal device belongs (or in which the second terminal device is located).

According to a fifth aspect, an embodiment of this application further provides an apparatus. The apparatus is used in an IMS core network element. For beneficial effects, refer to the descriptions in the second aspect. Details are not described herein again. The apparatus has a function of implementing the behavior in the method example in the second aspect. The function may be implemented by hardware, or may be implemented by hardware executing corresponding software. The hardware or the software includes one or more modules corresponding to the foregoing function. In a possible design, a structure of the apparatus may include a sending unit and a receiving unit. The units may perform corresponding functions in the method example in the second aspect. For details, refer to the detailed descriptions in the method example. Details are not described herein again.

According to a sixth aspect, an embodiment of this application further provides an apparatus. The apparatus is used in an AR media processing network element. For beneficial effects, refer to the descriptions in the third aspect. Details are not described herein again. The apparatus has a function of implementing the behavior in the method example in the third aspect. The function may be implemented by hardware, or may be implemented by hardware executing corresponding software. The hardware or the software includes one or more modules corresponding to the foregoing function. In a possible design, a structure of the apparatus may include a sending unit, a receiving unit, and a processing unit. The units may perform corresponding functions in the method example in the third aspect. For details, refer to the detailed descriptions in the method example. Details are not described herein again.

According to a seventh aspect, an embodiment of this application further provides an apparatus. The apparatus is used in the terminal device. For beneficial effects, refer to the descriptions in the fourth aspect. Details are not described herein again. The apparatus has a function of implementing the behavior in the method example in the fourth aspect. The function may be implemented by hardware, or may be implemented by hardware executing corresponding software. The hardware or the software includes one or more modules corresponding to the foregoing function. In a possible design, a structure of the apparatus includes a sending unit and a receiving unit. The units may perform corresponding functions in the method example in the fourth aspect. For details, refer to the detailed descriptions in the method example. Details are not described herein again.

According to an eighth aspect, an embodiment of this application further provides an apparatus. The apparatus is used in an IMS core network element. For beneficial effects, refer to the descriptions in the second aspect. Details are not described herein again. A structure of the communication apparatus includes a processor and a communication interface, and may further include a memory. The processor is configured to support the IMS core network element in performing a corresponding function in the method in the second aspect through the communication interface. The memory is coupled to the processor, and stores program instructions and data that are necessary for the communication apparatus.

According to a ninth aspect, an embodiment of this application further provides an apparatus. The apparatus is used in an AR media processing network element. For beneficial effects, refer to the descriptions in the third aspect. Details are not described herein again. A structure of the apparatus includes a processor and a communication interface, and may further include a memory. The processor is configured to support the AR media processing network element in performing a corresponding function in the method in the third aspect through the communication interface. The memory is coupled to the processor and stores program instructions and data that are necessary for the apparatus.

According to a tenth aspect, an embodiment of this application further provides an apparatus. The apparatus is used in a terminal device. For beneficial effects, refer to the descriptions in the fourth aspect. Details are not described herein again. A structure of the apparatus includes a processor and a communication interface, and may further include a memory. The processor is configured to support the terminal device in performing a corresponding function in the method in the fourth aspect through the communication interface. The memory is coupled to the processor and stores program instructions and data that are necessary for the apparatus.

According to an eleventh aspect, an embodiment of this application further provides an apparatus, and the apparatus is used in an application server. A structure of the communication apparatus includes a processor and a communication interface, and may further include a memory. The processor is configured to support the application server in performing a corresponding function of the application server in any one of the foregoing aspects through the communication interface. The memory is coupled to the processor, and stores program instructions and data that are necessary for the communication apparatus.

According to a twelfth aspect, this application further provides a computer-readable storage medium. The computer-readable storage medium stores instructions. When the instructions are run on a computer, the computer is enabled to perform the methods according to the foregoing aspects.

According to a thirteenth aspect, this application further provides a computer program product including instructions. When the computer program product runs on a computer, the computer is enabled to perform the methods according to the foregoing aspects.

According to a fourteenth aspect, this application further provides a computer chip. The chip is connected to a memory. The chip is configured to read and execute a software program stored in the memory, to perform the methods according to the foregoing aspects.

BRIEF DESCRIPTION OF THE DRAWINGS

For FIG. 1 is a schematic diagram of an architecture of a possible AR communication system according to an embodiment of this application.

DETAILED DESCRIPTION OF ILLUSTRATIVE EMBODIMENTS

Figure 1:
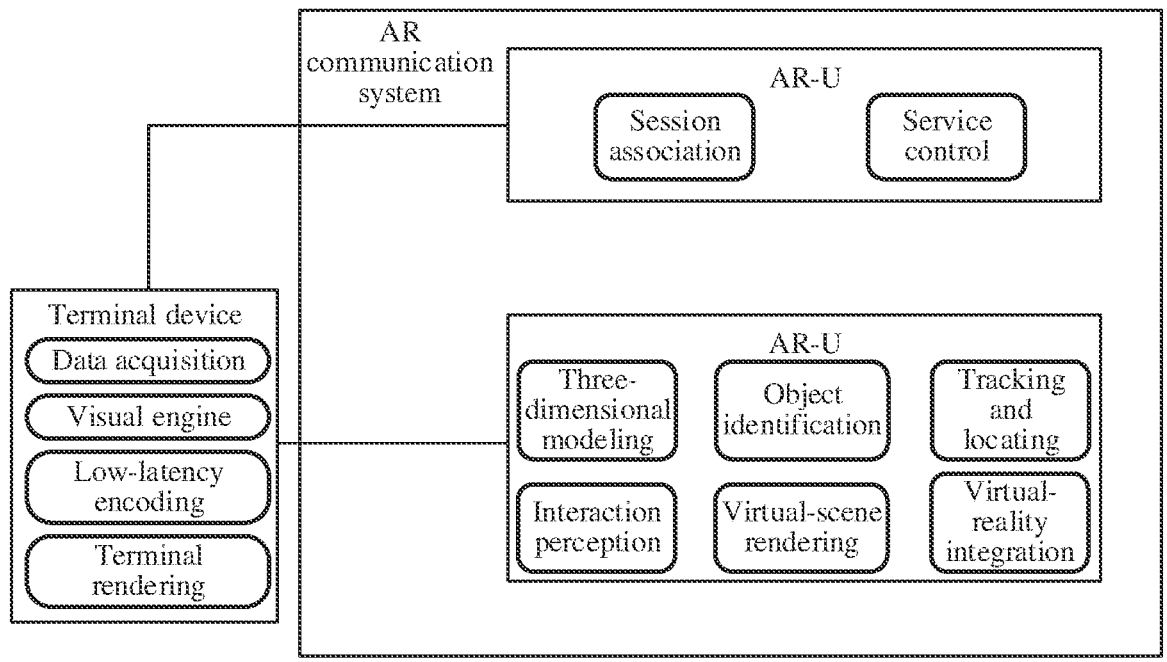
FIG. 8A-1 and FIG. 8A-2 are a schematic flowchart of another AR communication method according to an embodiment of this application.

This application provides an AR communication method and apparatus, to provide an implementation in which AR is integrated into voice and video calls, thereby improving user experience. The voice and video calls may be, but are not limited to, VoLTE, and may also be applicable to voice and video calls provided by a future technology. The AR has three characteristics: virtual-reality integration, real-time interaction, and three-dimensional registration. The virtual-reality integration is to superimpose a virtual object and information that are generated by a computer to a real-world scene, to understand the real scene more intuitively and deeply. Augmented information may be non-geometric information related to a real object, for example, a video and a text; or may be geometric information, for example, a virtual three-dimensional object and scene. The real-time interaction is real-time interaction between people and an augmented reality environment in a natural manner via an interaction interface device in an augmented reality system. The "registration" in the three-dimensional registration may be interpreted as tracking and locating. The three-dimensional registration is that a virtual object generated by a computer is in a one-to-one correspondence with a real environment, and a correct alignment relationship is continuously maintained when a user moves in the real environment.

The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. The term "at least one" in this application means one or more, that is, includes one, two, three, or more; and the term "a plurality of" means two or more, that is, includes two, three, or more. In addition, it can be understood that in the descriptions of this application, terms such as "first" and "second" are merely used for distinguishing and description, but cannot be understood as indicating or implying relative importance, or cannot be understood as indicating or implying a sequence. The term "at least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. It can be understood that in embodiments of this application, "B corresponding to A" indicates that B is associated with A, and B may be determined according to A. However, it can be further understood that determining B based on A does not mean that B is determined based only on A. B may alternatively be determined based on A and/or other information. In addition, the terms "include" and "have" in embodiments, claims, and accompanying drawings of this application are not exclusive. For example, a process, method, system, product, or device including a series of steps or modules is not limited to the enumerated steps or modules, and may further include a step or module that is not enumerated.

The following describes in detail solutions provided in embodiments of this application with reference to the accompanying drawings.

FIG. 1 is a schematic diagram of an architecture of an AR communication system according to an embodiment of this application. The AR communication system includes an AR media processing network element and an AR control network element. The AR media processing network element provides a media processing service for a terminal device that has an AR capability. The AR media processing network element has an AR user plane (AR User plane, AR-U) function, and may also be referred to as an AR-U network element. The AR control network element has an AR control plane function, and may also be referred to as an AR control plane (AR Control plane, AR-C) network element. In this embodiment, a network element may be referred to as a device. For example, the AR media processing network element may be referred to as an AR media processing device.

The terminal device that has the AR capability may have one or more of the following logical functions: supporting acquisition of audio and video data in a real scene via a camera and/or a sensor, supporting a logical operation function (for example, a visual engine may be deployed), supporting low-latency encoding and lightweight image rendering, supporting obtaining of a virtual object from a cloud, and the like. The terminal device in this embodiment of this application may be a device configured with a camera and having a video call function. For example, the terminal device may be a wearable device (for example, an electronic watch), or the terminal device may be a device, for example, a mobile phone or a tablet computer. A specific form of the terminal device is not specifically limited in this embodiment of this application.

The AR media processing network element has an AR media processing function. For example, the AR media processing function includes one or more of three-dimensional modeling, object identification, tracking and locating, interaction perception, virtual-scene rendering, virtual-reality integration, and the like. The three-dimensional modeling is to perform three-dimensional construction on a real environment based on data acquired by a terminal device. The object identification is to identify a concerned object of a terminal device user. The tracking and locating is to track and locate a concerned object of a terminal device user. The interaction perception is to implement consistency of a plurality of senses by using a user interaction technology. The virtual-scene rendering is to render a virtual scene. The virtual-reality integration is to integrate a virtual object with a real object.

The AR media processing network element supports establishment of a media stream channel and an auxiliary data channel with the terminal device. The media stream channel is for transmitting, between the terminal device and the AR media processing network element, AR core data (or referred to as media stream data, which may also be referred to as a media stream for short), for example, an audio and video stream. The auxiliary data channel is for transmitting AR auxiliary data between the terminal device and the AR media processing network element. The AR auxiliary data (or AR specific data) is a general name of non-media data transmitted between the terminal device and the AR media processing network element.

In an example, as shown in Table 1, a data type that may be included in AR auxiliary data in an uplink direction and a video data type that is included in AR core data are described as an example.

TABLE 1

| Data type | Data subtype | Description |
|---|---|---|
| AR auxiliary data | Operation type | Operation of a 2D/3D model |
| | Identification type | Identification of a facial expression/body movement |
| | Labeling type | Labeling/Tracking of a target object |
| | Pose type | Pose data acquired by a camera |
| | Tactility type | Tactile data acquired by a sensor |
| AR core data | Real-scene video | Real-scene video shot by the terminal |
| | Real-scene logic | The terminal completes tracking and three-dimensional reconstruction of the real-scene |

TABLE 1-continued

| Data type | Data subtype | Description |
|---|---|---|
| | | video, and obtains the corresponding real-scene logic |
| | Location information | The terminal only needs to upload the location information related to the real scene. |

In an example, as shown in Table 2, a data type that may be included in AR auxiliary data in a downlink direction and a video data type that is included in the audio and video streams are described as an example.

TABLE 2

| Data type | Data subtype | Description |
|---|---|---|
| AR auxiliary data | Model type | In response to a request from a device side, support 2D/3D model download |
| AR core data | Virtual scene | The virtual scene rendered by the cloud, including a virtual scene, a virtual role, a lighting special effect, and the like is delivered to the terminal, and the terminal completes virtual-reality integration based on three-dimensional reconstruction logic |
| | Virtual-scene logic | The cloud only needs to complete logical calculation of the virtual scene based on location tracking and three-dimensional reconstruction technologies and deliver the virtual-scene logic to the terminal, and the terminal completes virtual-scene rendering and virtual-reality integration based on the virtual-scene logic |

It can be understood that Table 1 and Table 2 are merely used as an example, and do not constitute a specific limitation on the AR auxiliary data and the AR core data.

The AR control network element has functions of a session association and service control. In an AR session scenario, the session association may include an association between the media stream between the terminal device and the AR media processing network element and a signaling stream between the AR media processing network element and an AS; or an association among the media stream between the terminal device and the AR media processing network element, a signaling stream between the AR media processing network element and an AS, and a message stream between the AS and a third-party server. The third-party server is configured to provide a material required for AR processing, such as a virtual object and a real background object. The service control may be to control AR media processing based on a service feature or the like. For example, different service features correspond to different AR media processing manners, and the AR control network element may indicate different AR media processing manners to the AR media processing network element based on different service features of the terminal device.

In a possible implementation, the AR media processing network element may be an IP multimedia subsystem (IMS) access gateway (AGW) or a media resource function (MRF). The AR control network element may be an application server.

Figure 2A:
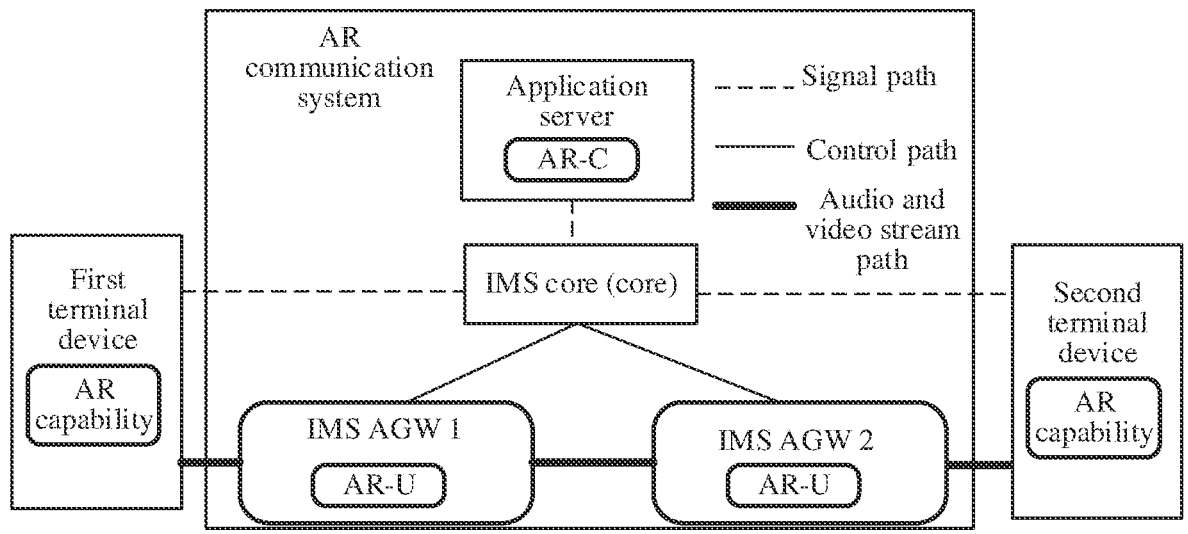
FIG. 2A is a schematic diagram of an architecture of another possible AR communication system according to an embodiment of this application.

As an example, as shown in FIG. 2A, an AR media processing network element is an IMS AGW, and an AR communication system includes the IMS AGW and an IMS core. The IMS core controls establishment of an auxiliary data channel and a media stream channel between the IMS AGW having an AR processing capability and a terminal device that has an AR capability. The auxiliary data channel is for transmitting AR auxiliary data for AR communication between at least two terminal devices. The media stream channel is for transmitting a media stream for AR communication between the at least two terminal devices. The IMS AGW may provide a media processing service for the terminal device. For example, when receiving the media stream through the media stream channel and the AR auxiliary data through the auxiliary data channel, the IMS AGW may perform augmented processing on the media stream by using the AR auxiliary data.

The AR communication system may further include an application server (AS). The AR communication system may further include at least two terminal devices. IMS AGWs respectively serving different terminal devices may be the same or different. In FIG. 2A, for example, the two terminal devices are respectively a first terminal device and a second terminal device, and IMS AGWs serving the first terminal device and the second terminal device are different, and are respectively an IMS AGW 1 and an IMS AGW 2. The two terminal devices in AR communication may both have the AR capability; or one terminal device may have the AR capability, and the other terminal device does not have the AR capability. In FIG. 2A, for example, both the first terminal device and the second terminal device have the AR capability. For example, different terminal devices access different IMS networks, and the IMS AGWs serving the different terminal devices are different. Different IMS AGWs serving the two terminal devices in AR communication may both have the AR processing capability; or only one IMS AGW has the AR processing capability, and the other IMS AGW does not have the AR processing capability. In FIG. 2A, both the IMS AGW 1 and the IMS AGW 2 have the AR processing capability. The IMS AGW 1 serves the first terminal device, or the IMS AGW 1 is an access gateway of the first terminal device, or the IMS AGW 1 is located in an IMS network to which the first terminal device belongs (or in which the first terminal device is located). The IMS AGW 2 serves the second terminal device. In other words, the IMS AGW 2 is an access gateway of the second terminal device, or the IMS AGW 2 is located in an IMS network to which the second terminal device belongs. One access gateway may serve a plurality of terminal devices. For example, the IMS AGW 1 serves the first terminal device, and further serves a third terminal device (not shown in FIG. 2A). The IMS core may include a call session control function (call session control function, CSCF) and/or a home subscriber server (home subscriber server, HSS). The IMS core may further include another network element. Details are not described in this embodiment of this application. The CSCF is a call control center of the IMS core, and implements functions such as user access, authentication, session routing, and service triggering on an IP transmission platform. The CSCF may include one or more of a serving-call session control function (S-CSCF), a proxy-CSCF (P-CSCF), and an interrogating-CSCF (I-CSCF). The HSS is configured to record subscription data (such as user information and service data) of a user. It is to be noted that an IMS core network element that provides a service for the first terminal device may be different from an IMS core network element that provides a service for the second terminal device, which, for example, is related to a location of the terminal device. As an example, the IMS core network element mentioned in this embodiment of this application may include the CSCF.

Figure 2B:
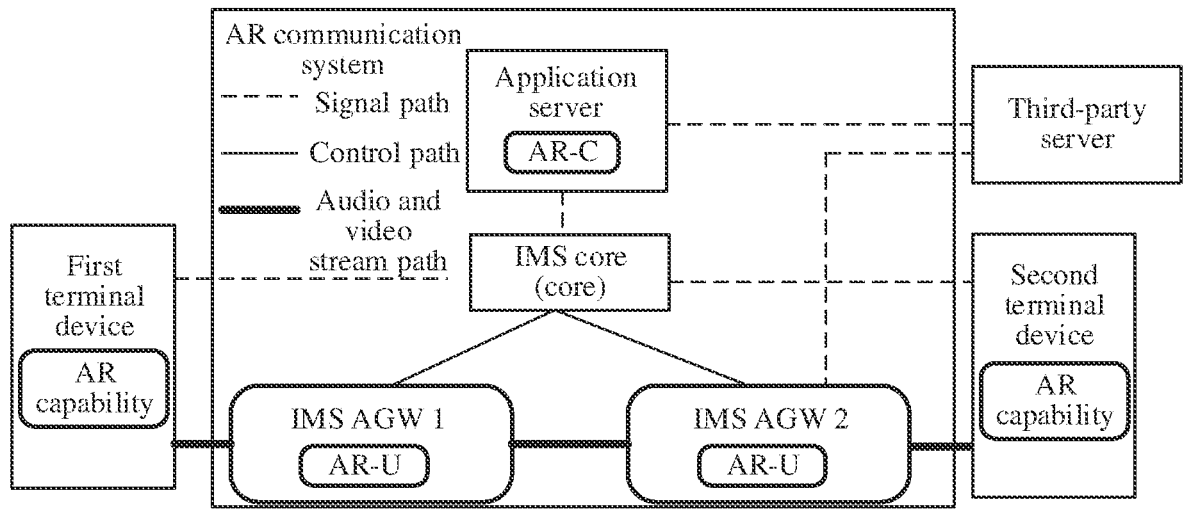
FIG. 2B is a schematic diagram of an architecture of still another possible AR communication system according to an embodiment of this application.
Figure 2C:
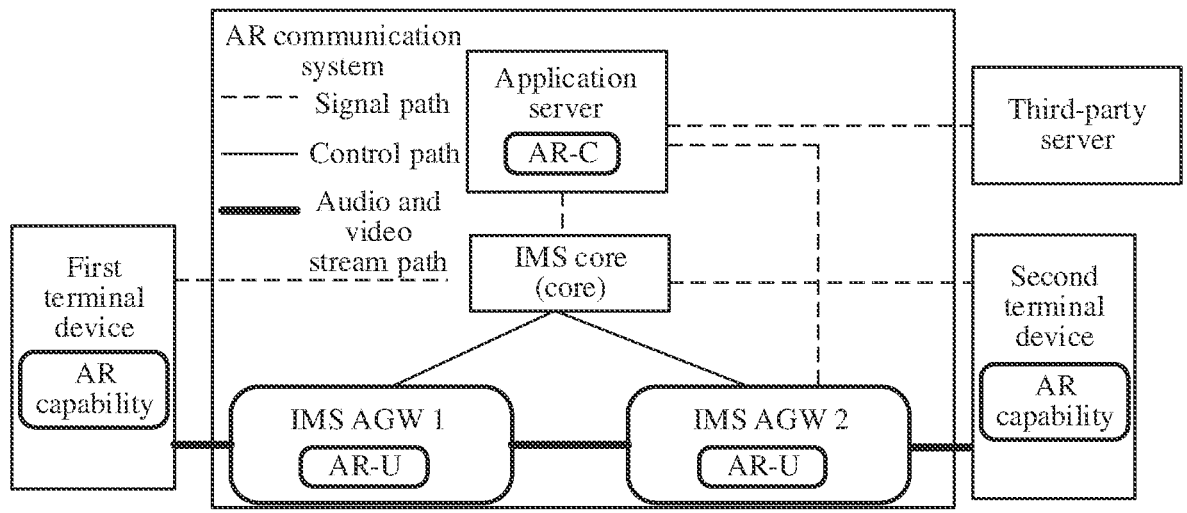
FIG. 2C is a schematic diagram of an architecture of yet another possible AR communication system according to an embodiment of this application.

In some embodiments, the AR communication system may further include a third-party server. The third-party server may be understood as a server of a third-party provider. The third-party server is configured to provide a target object required by the terminal device to perform AR communication, for example, a virtual object, or for another example, a real background object. The third-party server and the application server each are configured with address information of each other, which, for example, may include an IP address and a port number. In a possible example, refer to FIG. 2B. The third-party server supports establishing a communication connection to the AR media processing network element, which, for example, may be a hypertext transfer protocol (http) connection. In another possible example, the third-party server does not support establishing a communication connection to the AR media processing network element. As shown in FIG. 2C, the third-party server establishes a communication connection to the application server, for example, a hypertext transfer protocol http connection.

Figure 3:
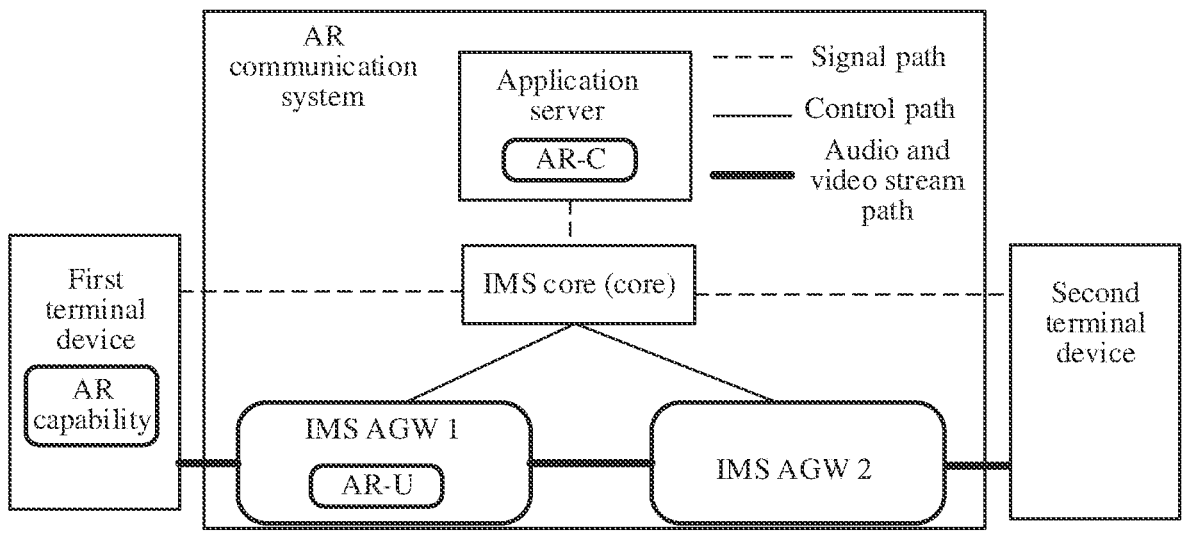
FIG. 3 is a schematic diagram of an architecture of another possible AR communication system according to an embodiment of this application.

As another example, one of the two terminal devices in AR communication does not have the AR capability. For example, as shown in FIG. 3, a first terminal device has an AR capability, and a second terminal device does not have the AR capability. In FIG. 3, an IMS AGW 1 serving the first terminal device has the AR capability.

Figure 4:
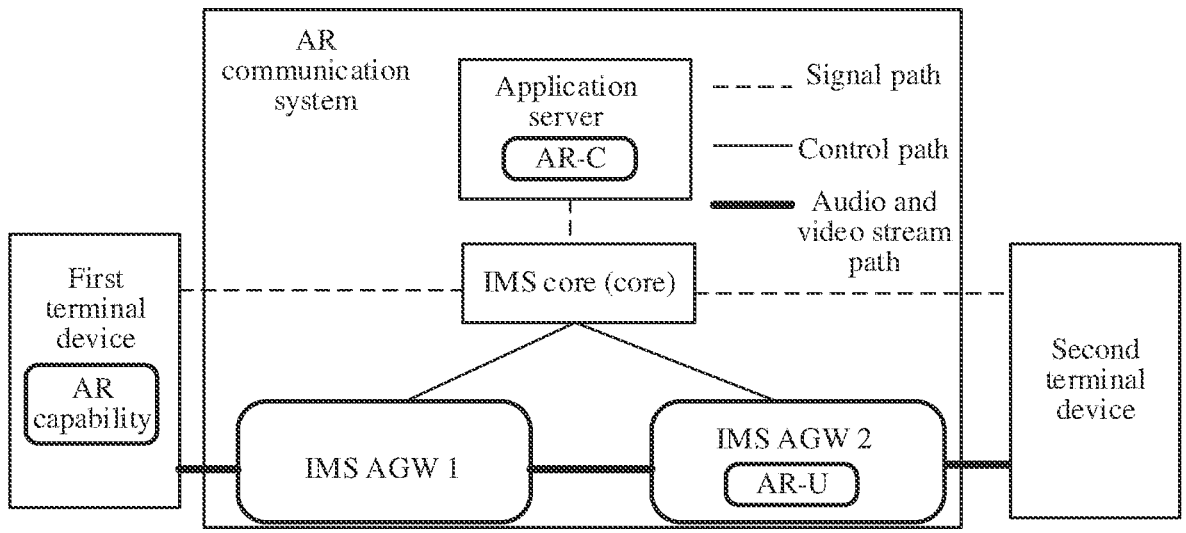
FIG. 4 is a schematic diagram of an architecture of another possible AR communication system according to an embodiment of this application.

As still another example, one of the two terminal devices in AR communication does not have the AR capability. For example, as shown in FIG. 4, a first terminal device has an AR capability, and a second terminal device does not have the AR capability. In FIG. 4, an IMS AGW 2 serving the second terminal device has an AR capability, and an IMS AGW 1 serving the first terminal device does not have the AR capability.

Figure 5:
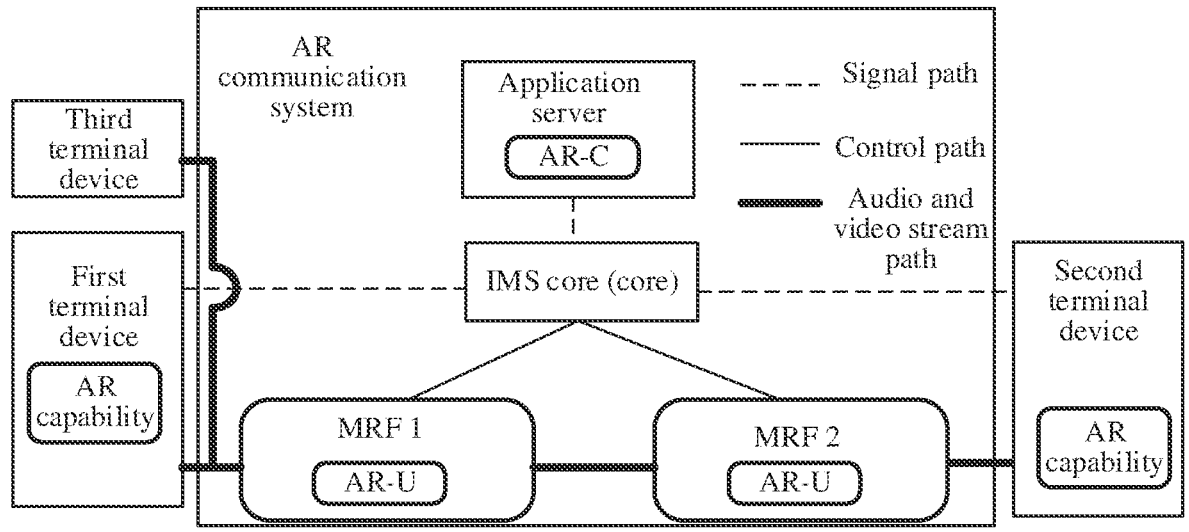
FIG. 5 is a schematic diagram of an architecture of another possible AR communication system according to an embodiment of this application.

In another possible implementation, an AR media processing network element may be a media resource function (MRF). As an example, as shown in FIG. 5, an example in which an AR media processing network element is an MRF is used, and an AR communication system includes the MRF, an IMS core, an application server (AS), and a third-party server is used. The MRF is usually classified as a media resource function controller (MRFC) and a media resource function processor (MRFP). In a conference scenario, a terminal device communicates with another terminal device via the MRF. The MRF is a central node between a session message and a media stream. In FIG. 5, a first terminal device, a second terminal device, and a third terminal device are used as examples. A plurality of terminal devices in an AR conference may all have an AR capability; or one or more of the terminal devices may have an AR capability, and other terminal devices do not have the AR capability. For example, in FIG. 5, both the first terminal device and the second terminal device have the AR capability, and the third terminal device does not have the AR capability. MRFs respectively serving a plurality of terminal devices may be the same or different. In FIG. 5, MRFs serving the first terminal device and the third terminal device are a same MRF, namely, an MRF 1, and an MRF serving the second terminal device is an MRF 2. Different MRFs serving a plurality of terminal devices that perform an AR conference may all have an AR processing capability; or only one or more of the MRFs have an AR processing capability, and other MRFs do not have the AR processing capability. Both the MRF 1 and the MRF 2 in FIG. 5 have the AR processing capability. The MRF 1 serves the first terminal device and the third terminal device, and the MRF 2 serves the second terminal device.

Optionally, in this embodiment of this application, the terminal device may establish different auxiliary data channels based on types of transmitted AR auxiliary data. For example, when pose data needs to be transmitted, an auxiliary data channel 1 is established, and when operation data needs to be transmitted, an auxiliary data channel 2 is established. The terminal device may alternatively transmit different types of AR auxiliary data through one auxiliary data channel.

Figure 6:
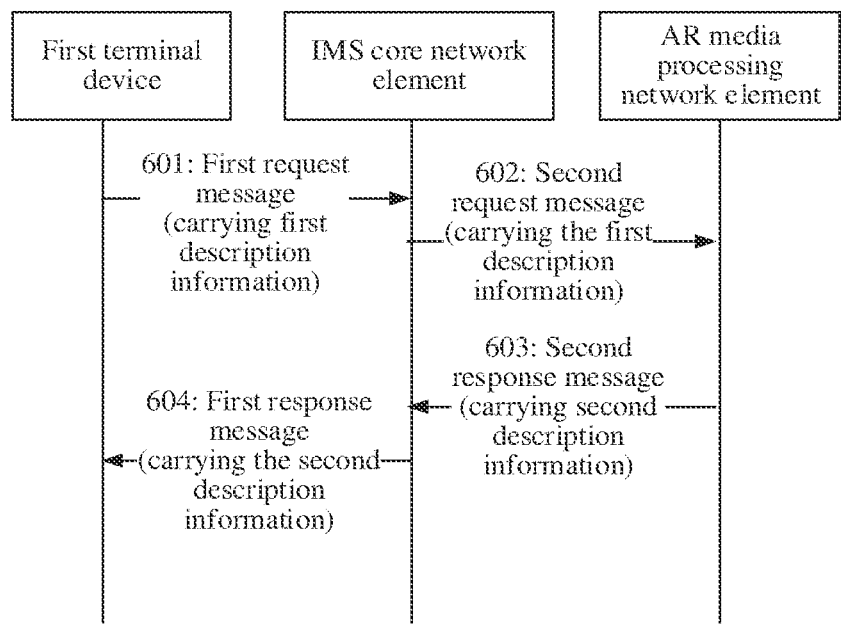
FIG. 6 is a schematic flowchart of an AR communication method according to an embodiment of this application.

An example in which the first terminal device and the second terminal device perform AR communication is used below, to describe a procedure of establishing an auxiliary data channel between the first terminal device and the AR media processing network element after the first terminal device and the second terminal device trigger AR communication. For details, refer to FIG. 6.

601: The first terminal device sends a first request message to an IMS core network element, where the first request message is for requesting for establishing of an auxiliary data channel.

The first request message may carry a first description parameter of the first terminal device. The first description parameter is used by the first terminal device for establishing of the auxiliary data channel with an AR media processing network element. Optionally, the first request message further carries an address of the first terminal device.

For example, the first description parameter may use a session description protocol (SDP). Certainly, the first description parameter may alternatively use another description protocol. This is not specifically limited in this application. In the following descriptions, an example in which the first description parameter uses the SDP is used. For ease of differentiation, SDP information carrying the first description parameter is referred to as first SDP information (which may be referred to as a first SDP for short). In other words, the first request message carries the first SDP information of the first terminal device. The first SDP information includes the description parameter for establishing the auxiliary data channel between the first terminal device and the AR media processing network element. For example, the first SDP information may include one or more of parameters such as a port number used by the first terminal device to transmit AR auxiliary data, a media stream type, and a supported codec format. The media stream type may include a video, an audio, and data channel (AR auxiliary data). For example, in this case, the first SDP information may include an m line for describing the AR auxiliary data.

In an example, the m line is described as follows.
m=application 10001 user datagram protocol (UDP)/data packet transport layer security (DTLS) protocol/stream control transmission protocol (SCTP) webrtc-datachannel.

The m line represents a description of a specific AR auxiliary data stream. 10001 may represent a port number of a quintuple, UDP/DTLS/SCTP represents a transmission protocol that the AR auxiliary data complies with, and webrtc-datachannel represents an established auxiliary data channel. The first SDP information may further include other information, for example, an a line for describing AR auxiliary data. In an example, the a line is described as follows.
a=dcmap:0 subprotocol=" "; ordered=true; max-retr=2; and label="AR-specific data", where
dcmap represents a parameter set that needs to be negotiated at two ends of the auxiliary data channel, where, for example, whether the data channel supports reliable transmission, whether a maximum quantity of retransmission times is set, and a sub-protocol format transferred in the data channel need to be negotiated. As shown in the foregoing example, 0 represents an auxiliary data channel whose ID is 0, and subprotocol represents a protocol type of AR auxiliary data transmitted through the auxiliary data channel whose ID is 0, where, for example, subprotocol=" " indicates that no protocol type is formulated at the two ends. For example, subprotocol="http" indicates that the AR auxiliary data transmitted inside the auxiliary data channel is in an http format. Ordered indicates whether reliable and ordered transmission is performed, max-retr represents a maximum quantity of retransmission times, where, for example, max-retr=2 indicates that the maximum quantity of retransmission times is 2, and label represents a description of the AR auxiliary data transmitted through the auxiliary data channel.

In another example, the first SDP information may further include the following.
a=dcsa:0 accept-types:text/plain, where
dcsa represents an SDP attribute of the auxiliary data channel, 0 represents an ID of a specific auxiliary data channel, and accept-type represents a format of the AR auxiliary data transmitted through the auxiliary data channel. accept-types:text/plain indicates that the AR auxiliary data is in a text format.

In an example, the first terminal device may send the first request message to the IMS core network element in a procedure of establishing AR communication with the second terminal device. For example, the first request message may be a session initiation protocol (SIP) invite message. The first request message may further carry address information of the first terminal device. For example, the address information of the first terminal device may include an IP address and/or a port number of the first terminal device.

Optionally, the first request message is further for requesting for establishing of a media stream channel, where the media stream channel is for transmitting a media stream for performing AR communication between the first terminal device and the second terminal device. The first request message further carries a description parameter for establishing the media stream channel between the first terminal device and the AR media processing network element. For example, the first SDP information further includes a description parameter for establishing the media stream channel between the first terminal device and the AR media processing network element.

In another example, the first terminal device may send a first request message to the IMS core network element in a procedure of re-establishing an AR session with the second terminal device. For example, the first request message may be a SIP Re-invite (re-invite) message.

In still another example, the first terminal device may send a first request message to the IMS core network element in a procedure of updating an AR session with the second terminal device. For example, the first request message may be a SIP update invite (update invite) message.

602: After receiving the first request message, the IMS core network element sends a second request message to the AR media processing network element. The second request message is for requesting for establishing of the auxiliary data channel between the AR media processing network element and the first terminal device. For example, the second request message further carries the first SDP information.

In this embodiment, the communication between the first terminal device and the second terminal device may be point-to-point communication between the first terminal device and the second terminal device, or may be conference communication established between the first terminal device and the second terminal device. The AR media processing network element is an IMS AGW having an AR processing capability or an MRF. For example, when point-to-point communication is performed between the first terminal device and the second terminal device, the AR media processing network element may be the IMS AGW. When AR conference communication is performed between the first terminal device and the second terminal device, the AR media processing network element may be the MRF. The AR media processing network element may be located in an IMS network to which the first terminal device belongs (or in which the first terminal device is located), and is configured to provide a service for the first terminal device; or the AR media processing network element may be located in an IMS network to which the second terminal device belongs (or in which the second terminal device is located), and is configured to provide a service for the second terminal device.

For example, when the AR media processing network element is the IMS AGW, the second request message may be an H248 protocol message, for example, an H248 add request message. For another example, when the AR media processing network element is the MRF, the second request message may be a SIP invite message.

603: When receiving the second request message, the AR media processing network element sends a second response message to the IMS core network element, where the second response message is a response message corresponding to the second request message. For example, the second response message indicates to the IMS core network element that the AR media processing network element agrees upon the establishing of the auxiliary data channel. For example, the second response message carries a second description parameter that is of the AR media processing network element and that is for establishing the auxiliary data channel. The AR media processing network element may determine, from the first description parameter, the second description parameter supported by the AR media processing network element. The second description parameter may use an SDP protocol, or may use another protocol. For ease of differentiation, the SDP information of the AR media processing network element is referred to as second SDP information (which may be referred to as a second SDP for short). The second SDP information includes a description parameter that is of the AR media processing network element and that is for establishing the auxiliary data channel with the first terminal device. For example, the second SDP information includes parameters such as a port of the auxiliary data channel corresponding to the AR media processing network element, a media stream type, and a supported codec format. The media stream type may include a video (video stream), an audio (audio stream), and datachannel (AR auxiliary data). For example, in this case, the second SDP information may include an m line for describing the AR auxiliary data obtained by the AR media processing network element through negotiation, and a media stream type of the m line is the AR auxiliary data.

604: When receiving the second response message, the IMS core network element sends a first response message to the first terminal device, where the first response message carries an address of the AR media processing network element. The first response message carries the second SDP information of the AR media processing network element.

In some embodiments, after receiving the first request message, the IMS core network element forwards the first request message to an application server. When determining that the first terminal device has subscribed to an AR service, the application server may send address information of the first terminal device to the AR media processing network element via the IMS core network element. The application server may add the address information of the application server to the first request message and send the first request message to the IMS core network element. In this way, the IMS core network element includes the address information of the application server in the second request message sent to the AR media processing network element, so that when the AR media processing network element subsequently needs to obtain content provided by a third-party server, the AR media processing network element may obtain the needed content from the third-party server via the AS.

For example, the application server may send a subscription query request to an HSS, to query whether subscription information of the first terminal device includes information about the subscribed AR service. The HSS may feed back the subscription information of the first terminal device to the application server by using a subscription query response. The subscription query request may be a diameter request message. The subscription query response may be a diameter response message.

In some other embodiments, after receiving the first request message, the MS core network element forwards the first request message to the application server. When determining that the first terminal device has subscribed to the AR service, the application server may send the stored address information of the third-party server to the AR media processing network element via the IMS core network element. The application server may add the address information of the third-party server to the first request message and send the first request message to the IMS core network element. In this way, the IMS core network element includes the address information of the third-party server in the second request message sent to the AR media processing network element, so that when needing to obtain content provided by the third-party server subsequently, the AR media processing network element may obtain the needed content from the third-party server.

In a possible implementation, the terminal device may learn in advance whether the AR media processing network element has the AR processing capability. For example, in a procedure of registering with a network side, the terminal device learns whether the AR media processing network element having the AR processing capability exists in the IMS network in which the terminal device is located.

In another possible implementation, before sending the second request message to the AR media processing network element, the IMS core network element first queries whether the AR media processing network element has the AR processing capability, for example, sends a query message to the AR media processing network element. The query message is for querying whether the AR media processing network element has the AR processing capability. After receiving the query message, the AR media processing network element sends indication information to the IMS core network element, to indicate whether the AR media processing network element has the AR processing capability. When it is determined that the AR media processing network element has the AR processing capability, the second request message is then sent to the AR media processing network element having the AR processing capability.

Figure 7A:
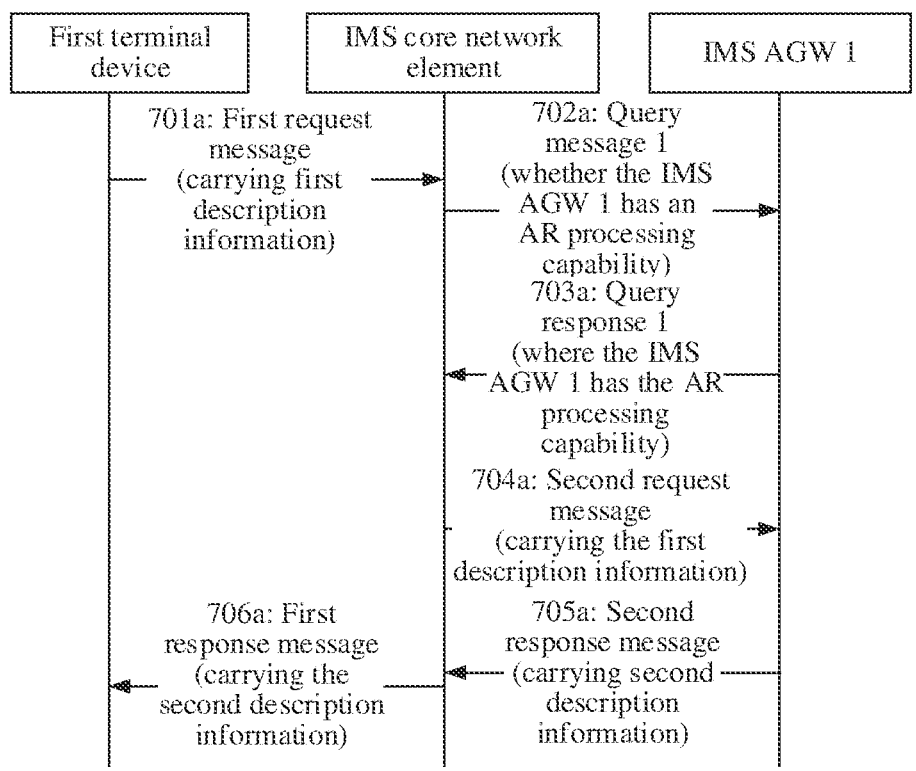
FIG. 7A is a schematic flowchart of another AR communication method according to an embodiment of this application.
Figure 7B:
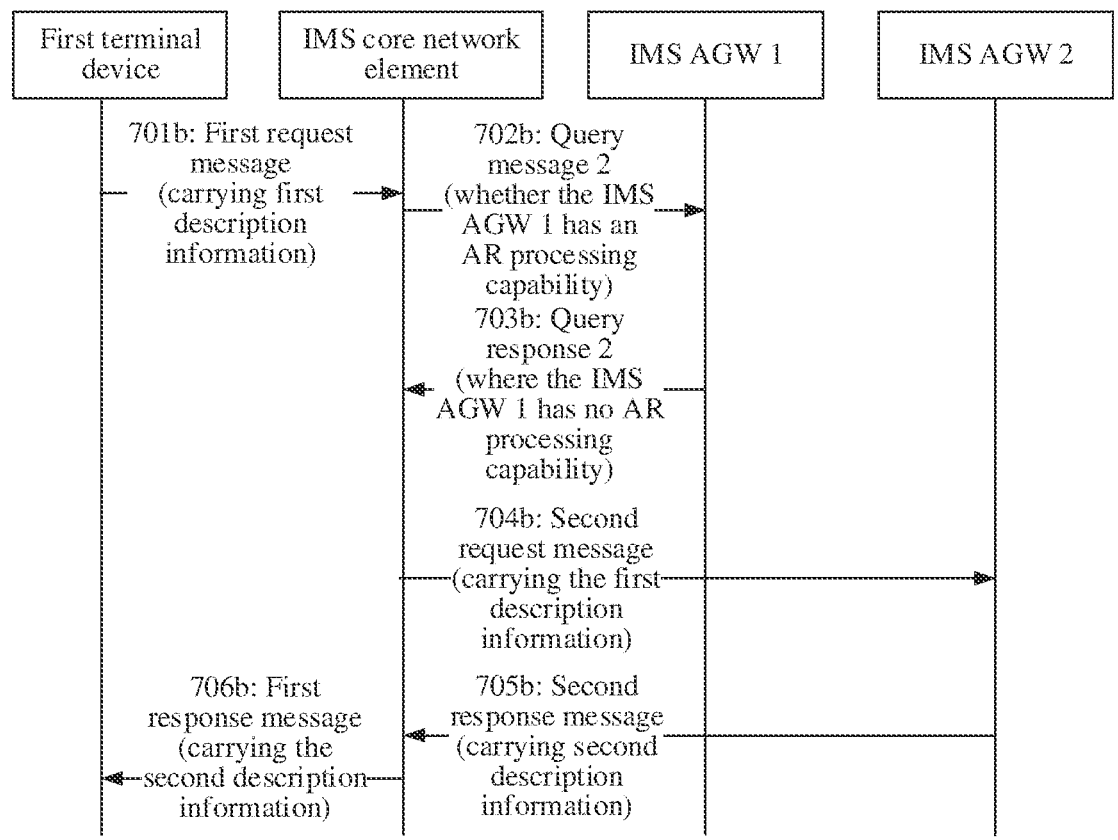
FIG. 7B is a schematic flowchart of still another AR communication method according to an embodiment of this application.

The AR media processing network element may be an IMS AGW having an AR processing capability or an MRF. For example, the AR media processing network element is the IMS AGW. Refer to FIG. 7A and FIG. 7B. For ease of differentiation, an IMS AGW that provides a service for a first terminal device is referred to as an IMS AGW 1, and an IMS AGW that provides a service for a second terminal device is referred to as an IMS AGW 2.

701a: Refer to 601. Details are not described herein again.

702a: When receiving a first request message of the first terminal device, the IMS core network element sends a query message 1 to the IMS AGW 1, where the query message 1 is for querying whether the IMS AGW 1 has an AR processing capability.

For example, the query message 1 may include a parameter for querying whether the IMS AGW 1 has the AR processing capability. For example, the parameter may be "ifSupportforAR_flag".

The query message 1 may be an H248 add request. The parameter "ifSupportforAR_flag" is added to the H248 add request.

703a: When it is determined that the IMS AGW 1 has the AR processing capability, the IMS AGW 1 sends a first indication to the IMS core network element, where the first indication indicates that the IMS AGW 1 has the AR processing capability. For example, the first indication may be "ifSupportforAR_flag=true". Optionally, the first indication may be carried in an H248 add response. The H248 add response includes "ifSupportforAR_flag=true".

704a: The IMS core network element sends a second request message to the IMS AGW 1. Refer to 602. Details are not described herein again.

For 705a and 706a, refer to 603 and 604. Details are not described herein again.

For 701b in FIG. 7B, refer to 601. Details are not described herein again.

702b: When receiving the first request message of the first terminal device, the IMS core network element sends a query message 2 to the IMS AGW 1, where the query message 2 is for querying whether the IMS AGW 1 has the AR processing capability.

For example, the query message 2 may include a parameter for querying whether the IMS AGW 1 has the AR processing capability. For example, the parameter may be "ifSupportforAR_flag". The query message 2 may be an H248 add request. The parameter "ifSupportforAR_flag" is added to the H248 add request.

703b: When determining that the IMS AGW 1 does not have the AR processing capability, the IMS AGW 1 sends a second indication to the IMS core network element, where the second indication indicates that the IMS AGW 1 does not have the AR processing capability. For example, the second indication may be "ifSupportforAR_flag=false". Optionally, the second indication may be carried in an H248 add response. The H248 add response includes "ifSupportforAR_flag=false". Alternatively, the H248 add response does not include the parameter "ifSupportforAR_flag=false", to indicate that the IMS AGW 1 does not have the AR processing capability.

704b: The IMS core network element sends a second request message to the IMS AGW 2.

For 705b and 706b, refer to 603 and 604. Details are not described herein again.

In another possible implementation, the IMS core network element includes, in the second request message sent to the AR media processing network element, a parameter for querying whether the AR media processing network element has the AR processing capability. For example, the second request message carries "ifSupportforAR_flag". When the AR media processing network element includes "ifSupportforAR_flag=true" in the second response message, it is determined that the AR media processing network element has the AR processing capability. Alternatively, if the AR media processing network element does not include the parameter "ifSupportforAR_flag=true" in the second response message but includes a second description parameter, it is determined that the AR media processing network element has the AR processing capability. Alternatively, if the AR media processing network element includes the parameter "ifSupportforAR_flag=false" in the second response message, it is determined that the AR media processing network element does not have the AR processing capability.

The following describes, with reference to a specific application scenario, a procedure of establishing an auxiliary data channel provided in an embodiment of this application.

In a first possible application scenario, the auxiliary data channel is established in a process of creating an AR session. In this scenario, for example, the AR media processing network element having an AR processing capability is the IMS AGW 1 to which the first terminal device belongs.

Figures 1, 8A:
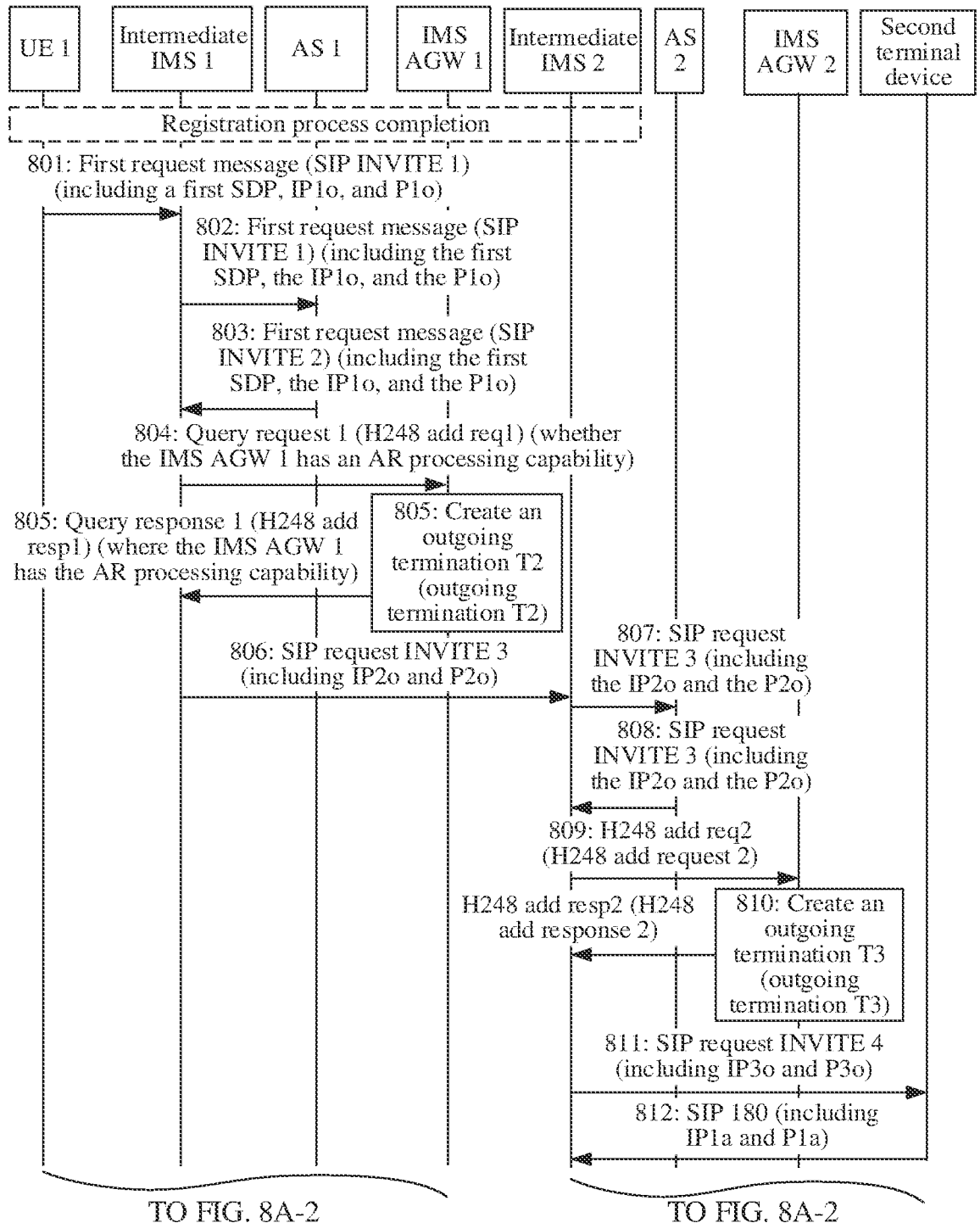
Figures 2, 8A:
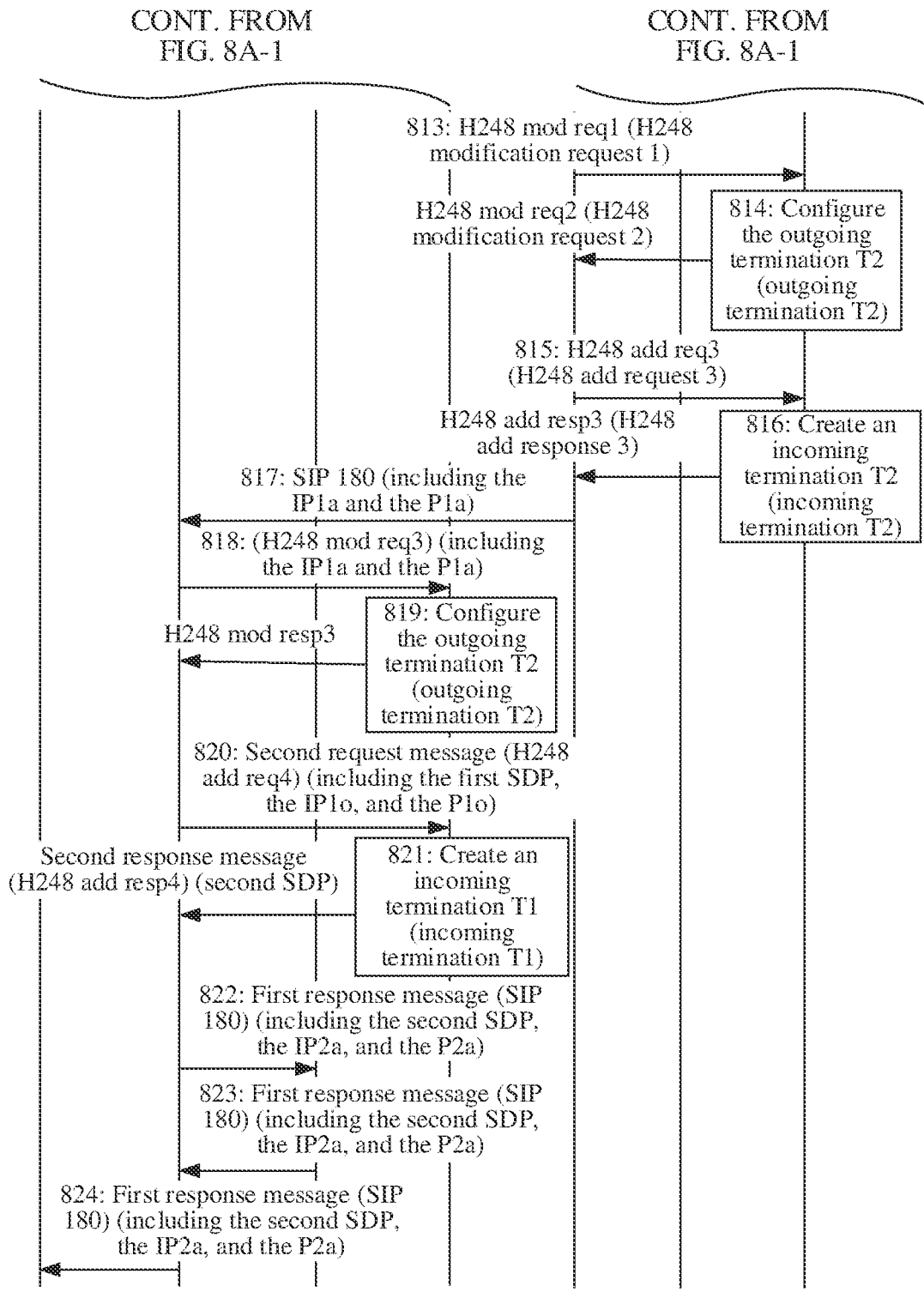

FIG. 8A-1 and FIG. 8A-2 are a schematic flowchart of a communication method in a first possible application scenario according to this application.

801: A first terminal device sends a first request message to an IMS core network element (for example, an intermediate IMS 1).

In this embodiment, for example, the IMS core network element configured to provide a service for the first terminal device is referred to as the intermediate IMS 1. In FIG. 8A-1 and FIG. 8A-2, for example, the first request message is a SIP INVITE message. For ease of differentiation, the first request message is referred to as a SIP INVITE 1 as an example. The SIP INVITE 1 is for requesting for establishing of an AR session. The SIP INVITE 1 includes a first SDP of the first terminal device. The first SDP includes a description parameter used by the first terminal device for establishing of an auxiliary data channel. The first SDP further includes a description parameter used by the first terminal device for establishing of a media stream channel. The SIP INVITE 1 further includes address information of the first terminal device, including an IP address and a port number of the first terminal device. In FIG. 8A-1 and FIG. 8A-2, the IP address is IP10, and the port number is P10. For example, the first SDP includes parameters such as address information (for example, a port number), a type of a media stream, and a supported codec format. The media stream type may include a video (video stream), an audio (audio stream), and datachannel (AR auxiliary data). For example, in this case, the first SDP information includes an m line for describing AR auxiliary data, and may further include an m line for describing audio data and an m line for describing video data. The m line describes a media stream (a video stream, an audio stream, or a stream including AR auxiliary data).

As an example, the following three m lines are defined, and are respectively an m line for the video stream, an m line for the audio stream, and an m line for the stream including the AR auxiliary data.

m=video 49154 RTP/AVPF 101 102. The $1^{st}$ parameter in the m line represents a media name, and indicates that a supported media stream type is the video (video). The $2^{nd}$ parameter represents a port number, and indicates that the video stream is sent through a port 49154. The $3^{rd}$ parameter represents a transmission protocol, in which a real-time transport protocol (real-time transport protocol, RTP)/audio video profile feedback (audio video profile feedback, AVPF) is used. The $4^{th}$ and $5^{th}$ parameters represent supported payload type numbers.

m=audio 49152 RTP/AVP 98 97 99. The $1^{st}$ parameter in the m line represents a media name, and indicates that a supported media stream type is audio. The $2^{nd}$ parameter represents a port number, and indicates that the audio stream is sent through a port 49152. A third parameter represents a transmission protocol, in which a real-time transport protocol (RTP)/audio video profile (AVP) is used. The $4^{th}$ to $6^{th}$ parameters represent supported payload type numbers.

m=application 10001 UDP/DTLS/SCTP webrtc-datachannel.

The m line represents a description of a specific AR auxiliary data stream. 10001 may represent a port number of a quintuple, UDP/DTLS/SCTP represents a transmission protocol that the AR auxiliary data complies with, and webrtc-datachannel represents an established auxiliary data channel.

The first SDP information may further include other information. For specific descriptions of the first SDP, refer to the descriptions in the embodiment corresponding to FIG. 6. Details are not described herein again.

802: The intermediate IMS 1 receives the SIP INVITE 1 from the first terminal device, and forwards the SIP INVITE 1 to an AS.

For example, after receiving the SIP INVITE 1, the intermediate IMS 1 determines, based on subscription data of the first terminal device, that the first terminal device has subscribed to an AR media augmentation service, and further forwards the SIP INVITE 1 to the AS. The AS provides a control service for the AR media augmentation service.

803: The AS sends a SIP INVITE 2 to the intermediate IMS 1.

After receiving the SIP INVITE 1, the AS determines that the AR service subscribed by the first terminal device triggers a corresponding AR service. The AS triggers establishment of an AR session via the intermediate IMS 1, in other words, triggers the SIP INVITE 2 to the intermediate IMS 1. Optionally, the SIP INVITE 2 triggered by the AS and the SIP INVITE 1 sent by the first terminal device may be a same message, or may be different messages.

In some embodiments, the AS identifies that the first terminal device triggers the AR service (or initiates the AR session), and the AS may record a session identifier of the AR session as the AR session, and establish a binding relationship between the session identifier and an identifier of the first terminal device. After the binding relationship is established, the binding relationship may be used subsequently when a target object is obtained from a third-party server via the AS. Details are described below, and are not described herein again.

804: The intermediate IMS 1 sends, to the IMS AGW 1, a query message for querying whether the IMS AGW 1 has an AR capability. For ease of differentiation, the query message for querying whether the IMS AGW 1 has the AR capability is referred to as a query message 1. The query message 1 may be an H248 add request 1 (req1). The H248 add request 1 may be for requesting for establishing of a bearer. For example, the H248 add request 1 carries a parameter for querying whether the IMS AGW 1 has an AR processing capability. For example, the parameter for querying whether the IMS AGW 1 has the AR processing capability may be "IfSupportforAR_flag".

Optionally, the H248 add request 1 is received, and an outgoing termination T2 (outgoing termination T2) is created. Specifically, an outgoing termination of the IMS AGW 1 is created. The IMS AGW 1 feeds back, to the intermediate IMS 1, address information corresponding to the termination T2 and indication information indicating whether the IMS AGW 1 has the AR processing capability.

805: After receiving the H248 add request 1, the IMS AGW 1 sends a query response 1 to the intermediate IMS 1, where the query response 1 includes the indication information indicating whether the IMS AGW 1 has the AR processing capability. For example, the query response 1 may be an H248 add response 1. The intermediate IMS 1 sends the H248 add response (resp) 1, where the H248 add response 1 includes the indication information and the address information corresponding to the termination T2. For example, the address information corresponding to the termination T2 includes an IP address and a port number. For example, the IP address is IP20, and the port number is P20. For example, the IMS AGW 1 has the AR processing capability, and the H248 add response includes "IfSupportforAR_flag=True"; or the IMS AGW 1 has the AR processing capability, and the H248 add response carries "IfSupportforAR_flag=False" or does not carry the parameter. In this embodiment, for example, the IMS AGW 1 has the AR processing capability.

806: After receiving the H248 add response 1, the intermediate IMS 1 identifies that the IMS AGW 1 has the AR processing capability, and triggers creation of an AR session to the intermediate IMS 1. The intermediate IMS 1 sends a SIP INVITE 3, where the SIP INVITE 3 carries the address information corresponding to the termination T2 of the IMS AGW 1.

It is to be noted that, if the intermediate IMS 1 identifies that the IMS AGW 1 has the AR processing capability, only an auxiliary data channel needs to be established between the first terminal device and the IMS AGW 1. In this case, an AR session establishment request sent to a network side of a second terminal device does not need to carry an SDP for requesting for establishing of the auxiliary data channel.

807: The intermediate IMS 2 sends, to an AS 2, the SIP INVITE 3 that carries the address information corresponding to the termination T2 of the IMS AGW 1.

808: The AS 2 sends, to the intermediate IMS 2, the SIP INVITE 3 that carries the address information corresponding to the termination T2 of the IMS AGW 1.

809: The intermediate IMS 2 sends, to an IMS AGW 2, an H248 add request 2 indicating the IMS AGW 2 to create an outgoing termination T2. For example, an IP address and a port number are included. For example, the IP address is IP30, and the port number is P30.

810: The IMS AGW 2 creates an outgoing termination T3, and sends, to the intermediate IMS 2, an H248 add resp 2 that carries address information corresponding to the termination T2 of the IMS AGW 2.

811: The IMS AGW 2 sends a SIP INVITE 4 to the second terminal device, where the SIP INVITE 4 includes the address information corresponding to the termination T2 of the IMS AGW 2.

812: The second terminal device sends a SIP 180 to the IMS AGW 2, where the SIP 180 carries address information (IP1a, P1a) of the second terminal device.

813: The intermediate IMS 2 sends, to the IMS AGW 2, an H248 mod request 1 indicating the IMS AGW 2 to configure an outgoing termination T1. For example, an association relationship between address information of T1 of the IMS AGW 2 and the address information of the second terminal device is established.

814: The IMS AGW 2 configures the outgoing termination T3, and sends an H248 mod resp 1 to the intermediate IMS 2. The H248 mod resp 1 may carry the address information corresponding to the termination T2 of the IMS AGW 2 and the address information of the second terminal device.

815: The intermediate IMS 2 sends, to the IMS AGW 2, an H248 add request 3 indicating the IMS AGW 2 to create an incoming termination T2. For example, the H248 add request 3 includes the address information corresponding to the termination T2 of the IMS AGW 1.

816: The IMS AGW 2 creates an incoming termination T2, and sends, to the intermediate IMS 2, an H248 add resp 2 that carries the address information (IP40, P40) corresponding to the termination T2 of the IMS AGW 2.

817: The intermediate IMS 1 receives the SIP 180 from the second terminal device, where, for example, the SIP 180 may include the address information of the second terminal device. For example, an IP address of the second terminal device is IP1a, and a port number of the second terminal device is P1a. The intermediate IMS 1 records the IP address and the port number of the second terminal device.

818: The intermediate IMS 1 sends a configuration modification request to the IMS AGW 1. For example, the configuration modification request may be an H248 mod req 3. The H248 mod req 3 includes the IP address (IP1a) and the port number (P1a) of the second terminal device. The H248 mod req 3 is for requesting the IMS AGW 1 to configure an outgoing termination T2.

819: The IMS AGW 1 configures the outgoing termination T2 based on the address information of the second terminal device, and sends a configuration modification response to the intermediate IMS 1, where the configuration modification response may be an H248 mod response 3.

820: The intermediate IMS 1 receives the configuration modification response from the IMS AGW 1, and sends a second request message to the IMS AGW 1. The second request message is for requesting for establishing of an auxiliary data channel, or may be for requesting to create an incoming termination T1, for example, by using an H248 add req 4. The H248 add req 4 is further for requesting for establishing of the auxiliary data channel. The H248 add req 4 includes the first SDP of the first terminal device and the address information of the first terminal device.

After receiving the H248 add req 4, the IMS AGW 1 creates an incoming termination T1, and agrees upon the establishing of the auxiliary data channel.

821: The IMS AGW 1 sends, to the intermediate IMS 1, a second response message that includes a response to information about the incoming termination T1, and may further include a response to the establishment of the auxiliary data channel. The second response message may be an H248 add response 4. The H248 add response 4 includes second SDP information of the IMS AGW 1 and address information of the IMS AGW 1. For example, the address information of the IMS AGW 1 includes an IP address (IP2a) and a port number (P2a) of the IMS AGW 1. Optionally, the H248 add response 4 may further include the address information of the first terminal device.

For example, the second SDP information includes the m line for describing the auxiliary data channel that needs to be established by the IMS AGW 1. In an example, a response of the IMS AGW 1 to the m line of the first terminal device may be described as follows.

m=application wool UDP/DTLS/SCTP webrtc-datachannel.

822: The intermediate IMS 1 records the address information of the termination T1 of the IMS AGW 1, and determines the second SDP information for establishing the auxiliary data channel, where a first response message sent to the AS includes the second SDP information and the address information of the IMS AGW 1. For example, the first response message may be a SIP 180. The SIP 180 includes the second SDP information and the address information of the IMS AGW 1.

823: The AS forwards the SIP 180 to the intermediate IMS 1.

824: The intermediate IMS 1 forwards the SIP 180 to the first terminal device.

In some embodiments, in step 803, after receiving the SIP INVITE 1, when determining that the first terminal device has subscribed to the AR service, the AS may send address information of the AS to the IMS AGW 1 via the intermediate IMS 1. The AS may add the address information of the AS to the SIP INVITE 1 and send the SIP INVITE 1 to the intermediate IMS 1. In this way, the second request message (H248 add request) sent by the intermediate IMS 1 to the IMS AGW 1 carries the address information of the AS, so that when the IMS AGW 1 subsequently needs to obtain content provided by the third-party server, the IMS AGW 1 may obtain the needed content from the third-party server via the AS.

For example, the AS may send a subscription query request to an HSS, to query whether the subscription information of the first terminal device includes information about the subscribed AR service. The HSS may feed back the subscription information of the first terminal device to the AS by using a subscription query response. The subscription query request may be a diameter request message. The subscription query response may be a diameter response message.

In some other embodiments, after receiving the SIP INVITE 1, the intermediate IMS 1 forwards the SIP INVITE 1 to the AS. When determining that the first terminal device has subscribed to the AR service, the AS may send stored address information of the third-party server to the IMS AGW 1 via the intermediate IMS 1. The AS may add the address information of the third-party server to the first request message and send the first request message to the intermediate IMS 1. In this way, the second request message (H248 add request) sent by the intermediate IMS 1 to the IMS AGW 1 carries the address information of the third-party server, so that when the IMS AGW 1 subsequently needs to obtain content provided by the third-party server, the IMS AGW 1 may obtain the needed content from the third-party server.

Figure 8B:
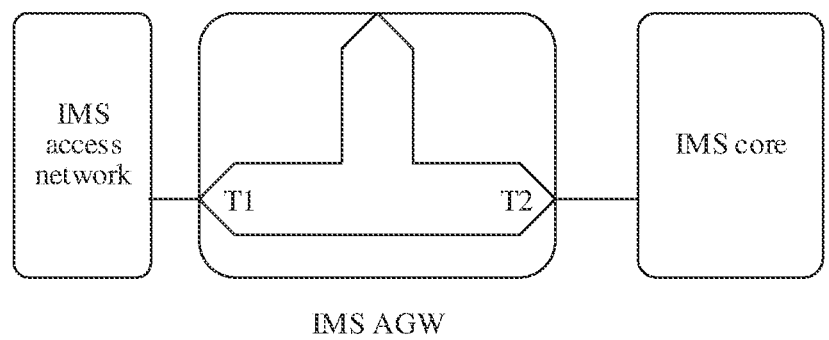
FIG. 8B is a schematic diagram of a termination T1 and a termination T2 on an IMS AGW according to an embodiment of this application.

With reference to FIG. 8B, the following describes the foregoing termination T1 and termination T2. The termination T1 is a termination that is on the IMS AGW and that is for connecting to a terminal device through an access network. The termination T2 is a termination that is on the IMS AGW and that is for connecting to an IMS core network. The IMS AGW can establish a connection with a communication peer terminal device through the IMS core network.

In a second possible application scenario, establishment of the auxiliary data channel is triggered by triggering a process of re-establishing an AR session. In this scenario, an example in which the IMS AGW 1 to which the first terminal device belongs has the AR processing capability is used.

Figure 9:
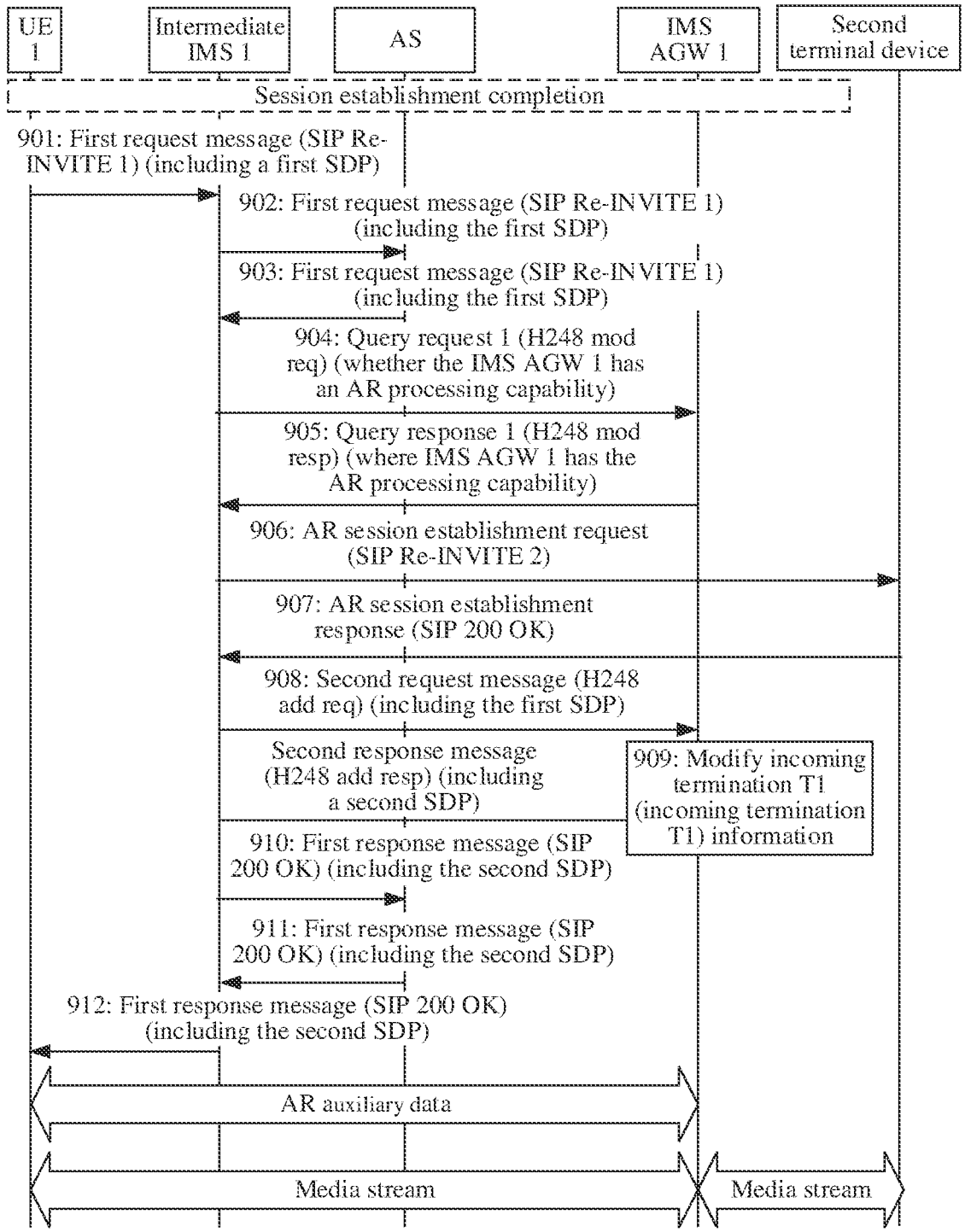
FIG. 9 is a schematic flowchart of another AR communication method according to an embodiment of this application.

FIG. 9 is a schematic flowchart of a communication method in a second possible application scenario according to this application.

901: After an AR session is established between a first terminal device and a second terminal device, the first terminal device sends a first request message to an IMS core network element (for example, an intermediate IMS 1). In FIG. 9, an example in which the first request message is a SIP re-establishment request (Re-INVITE 1) is used. The SIP Re-INVITE 1 is for requesting to create an auxiliary data channel. The SIP Re-INVITE 1 includes a first SDP of the first terminal device. For descriptions of the first SDP of the first terminal device, refer to the descriptions in the embodiment corresponding to FIG. 6. Details are not described herein again.

902: The intermediate IMS 1 receives the SIP Re-INVITE 1 from the first terminal device, and forwards the SIP Re-INVITE 1 to an AS.

903: The AS sends the SIP Re-INVITE 1 to the intermediate IMS 1.

904: The intermediate IMS 1 sends a query message 1 to an IMS AGW 1. The query message 1 may be carried in an H248 mod req. The H248 mod req is for requesting to establish a bearer. For example, the H248 mod req may further carry a parameter for querying whether the IMS AGW 1 has an AR processing capability. For example, the parameter for querying whether the IMS AGW 1 has the AR processing capability may be "IfSupportforAR_flag".

Optionally, after receiving the H248 mod req, the IMS AGW 1 indicates to the intermediate IMS 1 whether the IMS AGW 1 has the AR processing capability.

905: After receiving the H248 mod request, the IMS AGW 1 sends a query response 1 to the intermediate IMS 1, where the query response 1 includes indication information indicating whether the IMS AGW 1 has the AR processing capability. For example, the intermediate IMS 1 sends an H248 mod response, where the H248 mod response includes the indication information. For example, the IMS AGW 1 has the AR processing capability, and the H248 mod response includes "IfSupportforAR_flag=True"; or the IMS AGW 1 has the AR processing capability, and the H248 mod response carries "IfSupportforAR_flag=False" or does not carry the parameter. In this embodiment, for example, the IMS AGW 1 has the AR processing capability.

906: After receiving the H248 mod response, the intermediate IMS 1 identifies that the IMS AGW 1 has the AR processing capability, in other words, only an auxiliary data channel needs to be established between the first terminal device and the IMS AGW 1. In this case, an AR session establishment request sent to the second terminal device does not need to carry a request for requesting for establishing of the auxiliary data channel. The AR session establishment request may be a SIP Re-INVITE 2.

For example, the intermediate IMS 1 sends the SIP Re-INVITE 2 to the second terminal device via the intermediate IMS 2 to which the second terminal device belongs.

907: The intermediate IMS 1 receives, from the second terminal device, a SIP response, for example, a SIP 200 OK.

908: The intermediate IMS 1 sends a second request message to the IMS AGW 1, where the second request message may be for requesting for establishing of an auxiliary data channel, and is further for modifying incoming termination T1 information. For example, the intermediate IMS 1 sends, by using an H248 add req, a request for modifying the incoming termination T1 information to the IMS AGW 1. The H248 add req is further for requesting for establishing of the auxiliary data channel. The H248 add req includes the first SDP of the first terminal device.

After receiving the H248 add req, the IMS AGW 1 modifies the incoming termination T1 information, and agrees upon the establishing of the auxiliary data channel.

909: The IMS AGW 1 sends a response for modifying the incoming termination T1 information to the intermediate IMS 1. The response for modifying the incoming termination T1 information may be an H248 add response. The H248 add response includes second SDP information of the IMS AGW 1. For descriptions of the second SDP, refer to the descriptions in the embodiment corresponding to FIG. 6. Details are not described herein again.

910: The intermediate IMS 1 extracts the second SDP information of the IMS AGW and sends, to the AS, an AR session establishment response that includes the second SDP information. For example, the AR session establishment response may be a SIP 200 OK. The SIP 200 OK includes the second SDP information.

911: The AS forwards the SIP 200 OK to the intermediate IMS 1.

912: The intermediate IMS 1 forwards the SIP 200 OK to the first terminal device.

In some embodiments, in step 903, after receiving the SIP Re-INVITE 1, when determining that the first terminal device has subscribed to an AR service, the AS may send address information of the AS to the IMS AGW 1 via the intermediate IMS 1. The AS may add the address information of the AS to the SIP Re-INVITE 1 and send the SIP Re-INVITE 1 to the intermediate IMS 1. In this way, the second request message (H248 add request) sent by the intermediate IMS 1 to the IMS AGW 1 carries the address information of the AS, so that when the IMS AGW 1 subsequently needs to obtain content provided by the third-party server, the IMS AGW 1 may obtain the needed content from the third-party server via the AS.

In some other embodiments, after receiving the SIP Re-INVITE 1, the intermediate IMS 1 forwards the SIP Re-INVITE 1 to the AS. When determining that the first terminal device has subscribed to the AR service, the AS may send stored address information of the third-party server to the IMS AGW 1 via the intermediate IMS 1. The AS may add the address information of the third-party server to the first request message and send the first request message to the intermediate IMS 1. In this way, the second request message (H248 add request) sent by the intermediate IMS 1 to the IMS AGW 1 carries the address information of the third-party server, so that when the IMS AGW 1 subsequently needs to obtain content provided by the third-party server, the IMS AGW 1 may obtain the needed content from the third-party server.

In a third possible application scenario, the auxiliary data channel is established in a process of creating an AR session. In this scenario, for example, the IMS AGW 1 to which the first terminal device belongs does not have the AR processing capability, and the IMS AGW 2 to which the second terminal device belongs has the AR processing capability.

Figure 10A:
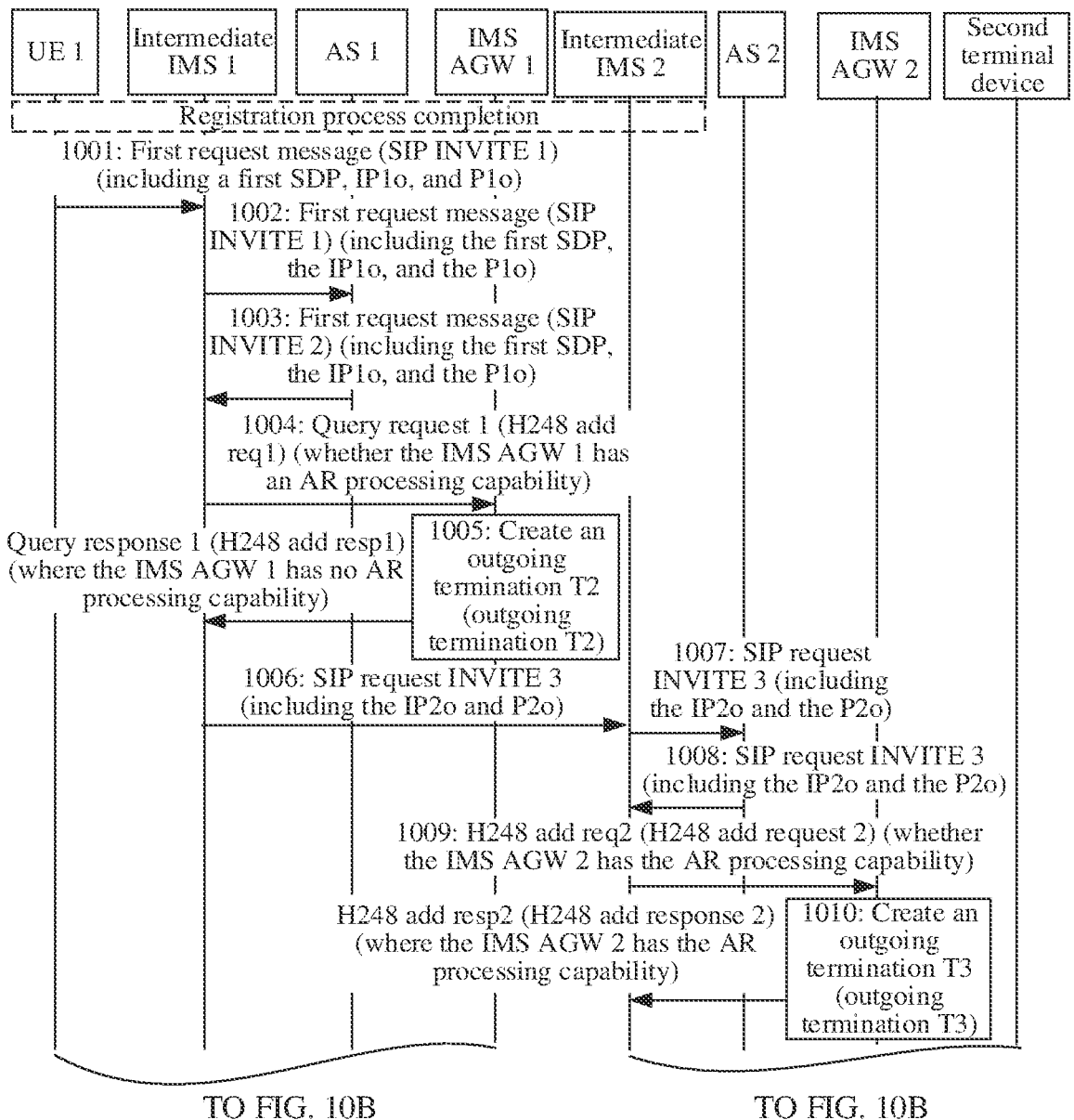
FIG. 10A and FIG. 10B are a schematic flowchart of another AR communication method according to an embodiment of this application.
Figure 10B:
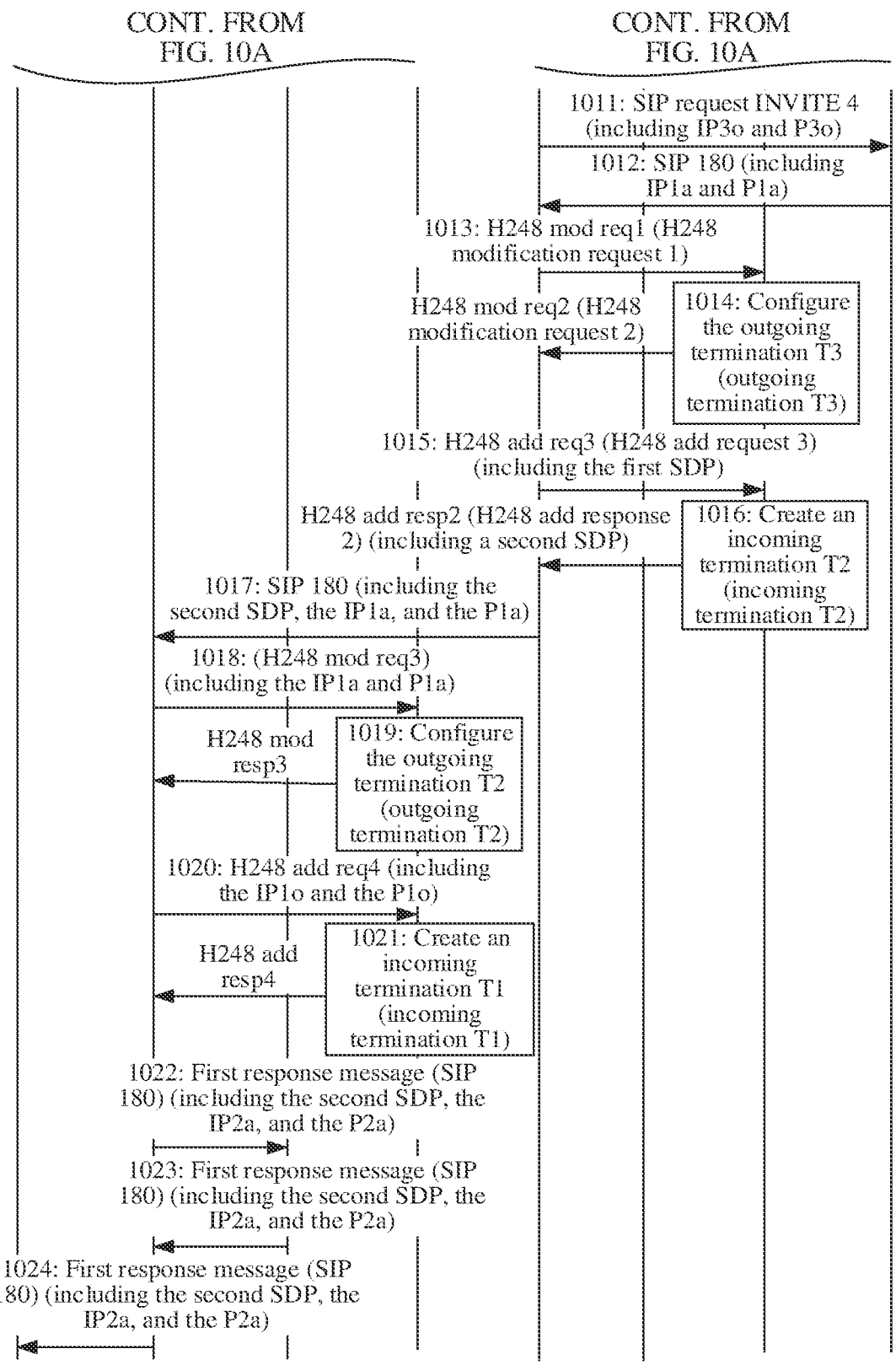

FIG. 10A and FIG. 10B are a schematic flowchart of a communication method in a third possible application scenario according to this application.

1001 to 1004: Refer to 801 to 804. Details are not described herein again.

1005: After receiving an H248 add request, an IMS AGW 1 sends, to an intermediate IMS 1, indication information indicating whether the IMS AGW 1 has an AR processing capability. For example, the intermediate IMS 1 sends an H248 add response, where the H248 add response carries the indication information and address information corresponding to a termination T2. For example, the address information corresponding to the termination T2 includes an IP address and a port number. For example, the IP address is IP20, and the port number is P20. For example, the IMS AGW 1 has the AR processing capability, and the H248 add response includes "IfSupportforAR_flag=True"; or the IMS AGW 1 has the AR processing capability, and the H248 add response carries "IfSupportforAR_flag=False" or does not carry this parameter. In this embodiment, for example, the IMS AGW 1 does not have the AR processing capability.

After receiving the H248 add response, the intermediate IMS 1 identifies that the IMS AGW 1 does not have the AR processing capability, and sends a second request message (SIP INVITE 2) to an IMS AGW 2 via the intermediate IMS 2 to which a second terminal device belongs and an AS. The SIP INVITE 2 sent to the second terminal device does not need to carry a request for requesting for establishing of an auxiliary data channel. The SIP INVITE 2 sent to the second terminal device carries the address information corresponding to the termination T2 of the IMS AGW 1.

1006 to 1008: Refer to 806 to 808. Details are not described herein again.

1009: After receiving the SIP INVITE 3 from the AS, the intermediate IMS 2 may send a query message 2 to the IMS AGW 2.

The query message 2 may be carried in an H248 add req 2. For example, the H248 add req 2 may further carry a parameter for querying whether the IMS AGW 2 has the AR processing capability. For example, the parameter for querying whether the IMS AGW 2 has the AR processing capability may be "IfSupportforAR_flag". The H248 add req 2 further indicates to create an outgoing termination T2. For details, refer to 809. Details are not described herein again.

Optionally, after receiving the H248 add req 2, the IMS AGW 2 indicates to the intermediate IMS 2 whether the IMS AGW 2 has the AR processing capability.

1010: After receiving the H248 add request 2, the IMS AGW 2 sends a query response 2 to the intermediate IMS 2, where the query response 2 includes indication information 2 indicating whether the IMS AGW 2 has the AR processing capability. For example, the IMS AGW 2 sends an H248 add response 2 (namely, the query response 2), where the H248 add response 2 includes the indication information 2. For example, the IMS AGW 2 has the AR processing capability, and the H248 add response 2 includes "IfSupportforAR_flag=True"; or the IMS AGW 2 has the AR processing capability, and the H248 add response carries "IfSupportforAR_flag=False" or does not carry this parameter. In this embodiment, for example, the IMS AGW 2 has the AR processing capability. The H248 add response 2 further includes address information of T2.

1011 to 1014: Refer to 811 to 814. Details are not described herein again.

1015: The intermediate IMS 2 sends, to the IMS AGW 2, an H248 add request 3 indicating the IMS AGW 2 to create an incoming termination T1 The H248 add request 3 is further for requesting for establishing of an auxiliary data channel with the first terminal device. The H248 add request 3 includes the first SDP of the first terminal device. For example, the H248 add request 3 further includes the address information corresponding to the termination T2 of the IMS AGW 1.

1016: The IMS AGW 2 creates an incoming termination T2, and sends an H248 add resp 3 to the intermediate IMS 2, where the H248 add resp 2 includes an acknowledgment for creating the auxiliary data channel, for example, a second SDP of the IMS AGW 2, and further includes address information (IP40, P40) corresponding to a termination T2 of the IMS AGW 2.

1017: The intermediate IMS 2 sends a SIP 180 to the intermediate IMS 1.

1018: The intermediate IMS 1 sends a configuration modification request to the IMS AGW 1. For example, the configuration modification request may be an H248 mod req 3. The H248 mod req 3 is for requesting the IMS AGW 1 to configure an outgoing termination T2.

1019: The IMS AGW 1 configures an outgoing termination T2, and sends a configuration modification response message to the intermediate IMS 1, where the configuration modification response message may be an H248 mod response 3.

1020: The intermediate IMS 1 receives the configuration modification response message from the IMS AGW 1, and then initiates to the IMS AGW 1 to create an incoming termination T1. For example, a request message for creating the incoming termination T1 carries a request for establishing an auxiliary data channel and address information of the first terminal device. The request message for creating the incoming termination T1 may be an H248 add req 4.

1021: The IMS AGW 1 sends an H248 add response 4 to the intermediate IMS 1. The H248 add response 4 includes address information of the IMS AGW 1. For example, the address information of the IMS AGW 1 includes an IP address (IP2a) and a port number (P2a) of the IMS AGW 1. Optionally, the H248 add response 4 may further include the address information of the first terminal device.

1022: The intermediate IMS 1 records address information of the termination T1 of the IMS AGW 1, and sends, to the AS, a SIP 180 that includes the second SDP information of the IMS AGW 2 and the address information of the IMS AGW 1.

1023: The AS forwards the SIP 180 to the intermediate IMS 1.

1024: The intermediate IMS 1 forwards the SIP 180 to the first terminal device.

In some embodiments, after receiving a SIP INVITE 3, the AS 2 may send address information of the AS 2 to the IMS AGW 2 via the intermediate IMS 2. The AS 2 may add the address information of the AS 2 to the SIP INVITE 3 and send the SIP INVITE 3 to the intermediate IMS 2. In this way, the H248 add req 3 sent by the intermediate IMS 2 to the IMS AGW 2 carries the address information of the AS 2, so that when the IMS AGW 2 subsequently needs to obtain content provided by a third-party server, the IMS AGW 2 may obtain the needed content from the third-party server via the AS.

In some other embodiments, after receiving the SIP INVITE 3, the intermediate IMS 2 forwards the SIP INVITE 3 to the AS 2. The AS 2 may send stored address information of the third-party server to the IMS AGW 2 via the intermediate IMS 2. The intermediate IMS 2 may add the address information of the third-party server to an H248 add req 3 and send the H248 add req 3 to the IMS AGW 2, so that when the IMS AGW 2 subsequently needs to obtain content provided by the third-party server, the IMS AGW 1 may obtain the needed content from the third-party server.

In a fourth possible application scenario, the auxiliary data channel is established in a process of creating an AR conference. In this scenario, an example in which the MRF to which the first terminal device belongs has the AR processing capability is used.

Figure 11:
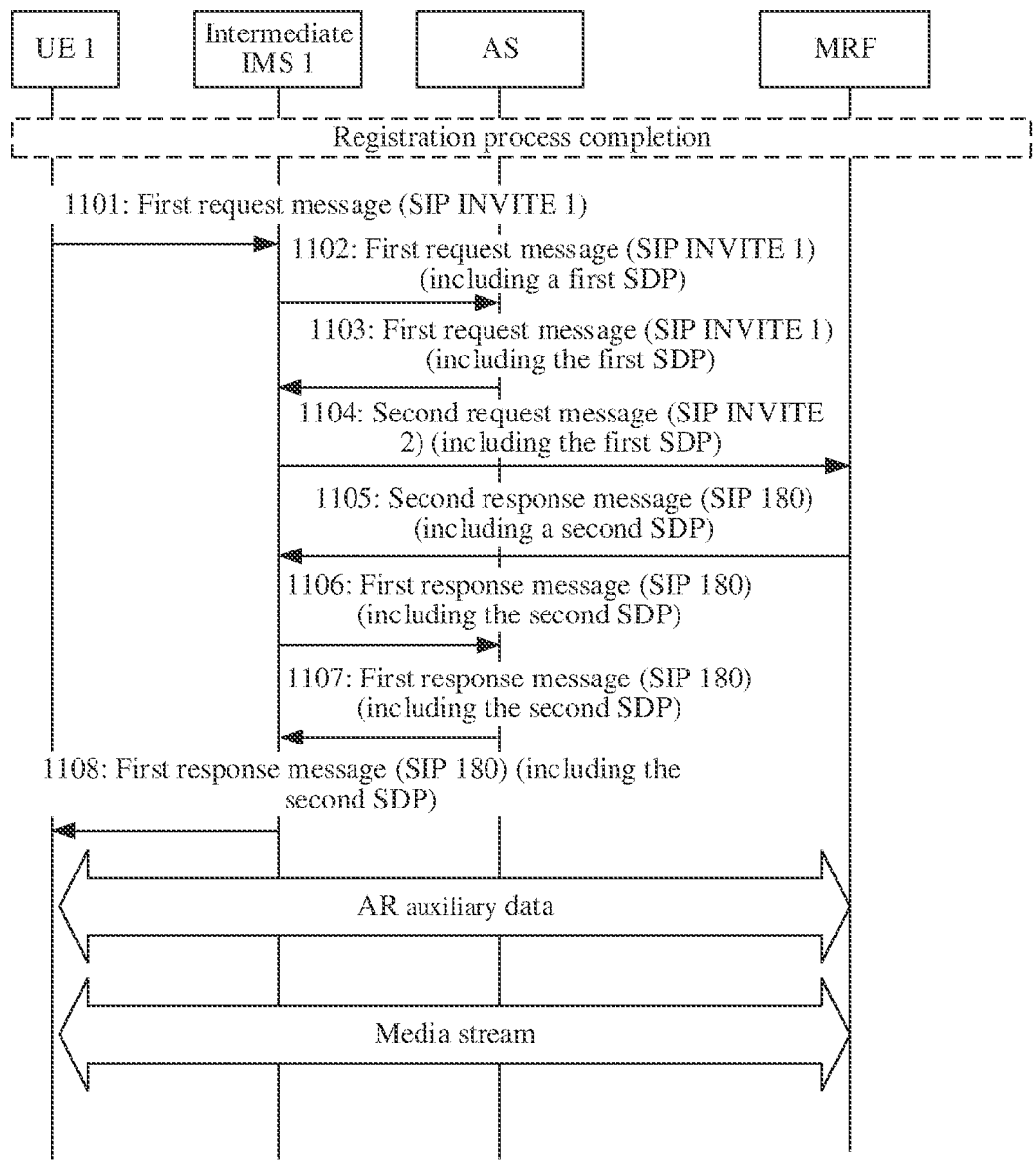
FIG. 11 is a schematic flowchart of another AR communication method according to an embodiment of this application.

FIG. 11 is a schematic flowchart of a communication method in a fourth possible application scenario according to this application.

1101 to 1103: Refer to 801 to 803. Details are not described herein again.

1104: An intermediate IMS 1 identifies that a first terminal device initiates an AR conference, and sends a second request message to an MRF, where the second request message includes a first SDP of the first terminal device. The second request message may be a SIP INVITE 2.

1105: When it is determined that the MRF has an AR processing capability, the MRF sends a second response message to the intermediate IMS 1, where the second response message includes a second SDP of the MRF. When it is determined that the MRF does not have an AR processing capability, the MRF ignores a request of the first terminal device for establishing an auxiliary data channel. For example, the second response message may be a SIP 180.

1106: The intermediate IMS 1 sends a first response message to an AS, where the first response message may be the SIP 180. The first response message includes the second SDP of the MRF.

1107: The AS sends a first response message to the intermediate IMS 1.

1108: The intermediate IMS 1 sends the first response message to the first terminal device.

In some embodiments, in step 1103, after receiving a SIP INVITE 1, when determining that the first terminal device has subscribed to an AR service, the AS may send address information of the AS to the MRF via the intermediate IMS 1. The AS may add the address information of the AS to the SIP INVITE 1 and send the SIP INVITE 1 to the intermediate IMS 1. In this way, the second request message (SIP INVITE 2) sent by the intermediate MRF 1 to the MRF carries the address information of the AS, so that when the MRF subsequently needs to obtain content provided by a third-party server, the MRF may obtain the needed content from the third-party server via the AS.

In some other embodiments, after receiving the SIP INVITE 1, the intermediate IMS 1 forwards the SIP INVITE 1 to the AS. When determining that the first terminal device has subscribed to the AR service, the AS may send stored address information of the third-party server to the MRF via the intermediate IMS 1. The AS may add the address information of the third-party server to the first request message and send the first request message to the intermediate IMS 1. In this way, the second request message (SIP INVITE 2) sent by the intermediate IMS 1 to the MRF carries the address information of the third-party server, so that when the IMS AGW 1 subsequently needs to obtain content provided by the third-party server, the MRF may obtain the needed content from the third-party server.

With reference to an embodiment, the following describes a procedure of augmenting a media stream by completing establishment of an auxiliary data channel in embodiments of this application.

Figure 12A:
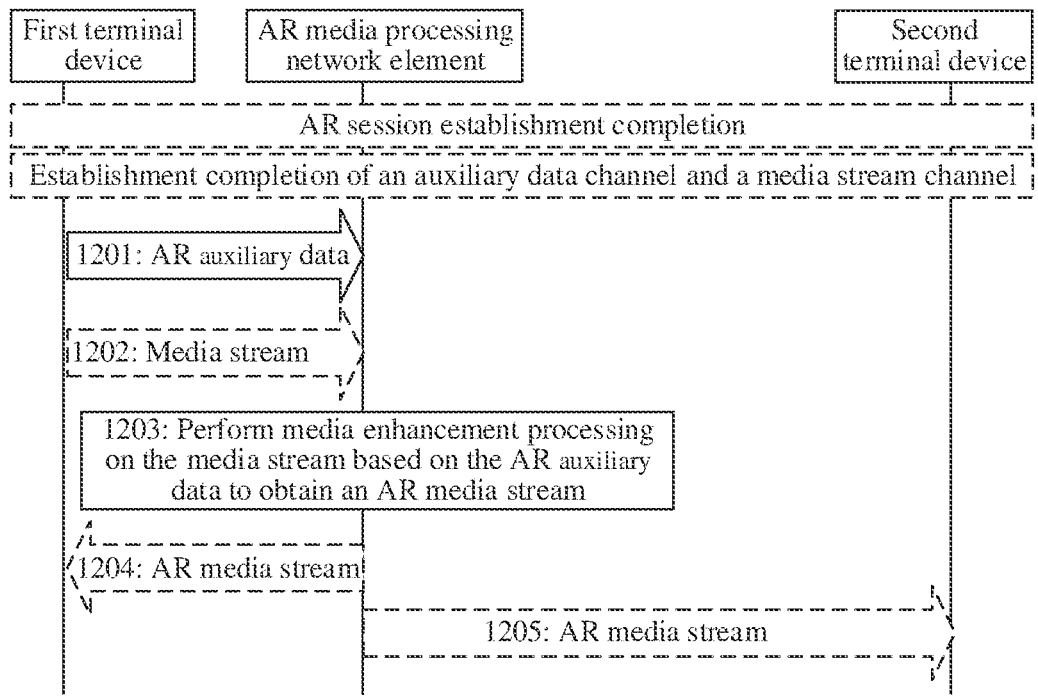
FIG. 12A is a schematic flowchart of another AR communication method according to an embodiment of this application.

FIG. 12A describes a procedure of augmenting a media stream in a process of performing AR communication between a first terminal device and a second terminal device. An auxiliary data channel is established between the first terminal device and an AR media processing network element. A media stream channel is further established between the first terminal device and the second terminal device. The media stream channel passes through the AR media processing network element.

1201: The first terminal device sends AR auxiliary data to the AR media processing network element through the auxiliary data channel in the process of performing AR communication with the second terminal device. The AR media processing network element is located in an IMS network of the first terminal device or is located in an IMS network of the second terminal device. The AR media processing network element may be an IMS AGW or an MRF.

1202: The first terminal device sends the media stream to the AR media processing network element through the media stream channel. The media stream is generated in the process of performing AR communication between the first terminal device and the second terminal device.

1203: The AR media processing network element performs media augmented processing on the media stream based on the AR auxiliary data to obtain an AR media stream.

1204: The AR media processing network element sends the AR media stream to the first terminal device. The first terminal device receives the AR media stream.

Optionally, in 1205, the AR media processing network element sends the AR media stream to the second terminal device through the media stream channel. The second terminal device receives the AR media stream.

Figure 12B:
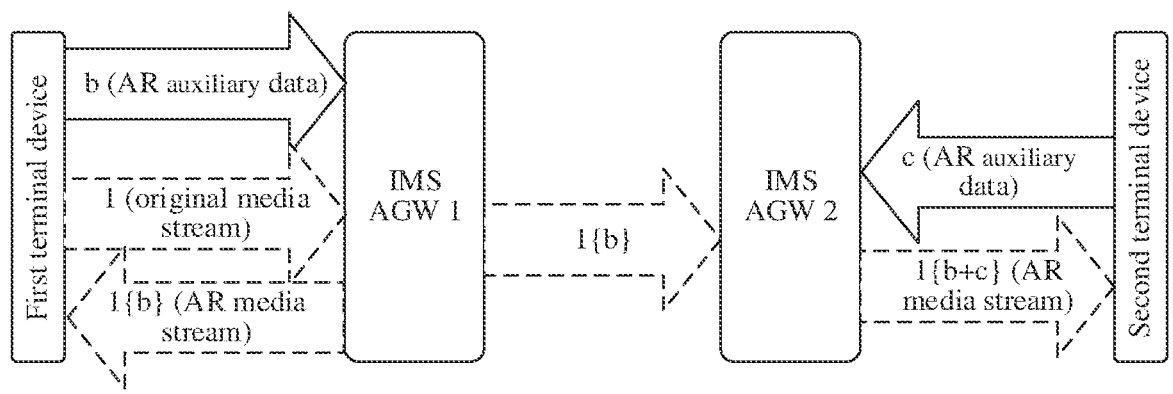
FIG. 12B is a schematic flowchart of still another AR communication method according to an embodiment of this application.
Figure 12C:
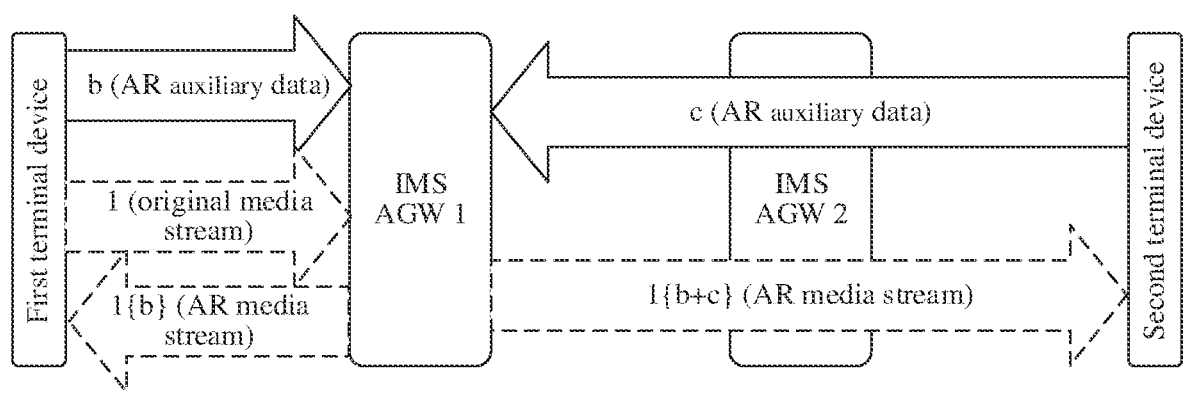
FIG. 12C is a schematic flowchart of yet another AR communication method according to an embodiment of this application.

For example, the AR media processing network element is the IMS AGW. An IMS AGW serving the first terminal device is referred to as an IMS AGW 1, and an IMS AGW that provides a service for the second terminal device is referred to as an IMS AGW 2. As shown in FIG. 12B, both the IMS AGW 1 and the IMS AGW 2 have an AR processing capability. In this application, an AR auxiliary data proximity processing principle is used. If AR auxiliary data (non-media data) received by the IMS AGW 1 is data related to the first terminal device, for example, pose data of a user of the first terminal device, the AR auxiliary data is used only for performing pose rendering on a media stream shared by the first terminal device. Therefore, the IMS AGW 1 obtains 1{a+b} (AR media stream) through combination and rendering based on 1 (an original media stream), a (non-media data such as the pose data of the user of the first terminal device) and b (non-media data such as user annotation data acquired by the first terminal device), and returns the AR media stream to the first terminal device. The IMS AGW 1 then obtains 1{b} (AR media stream) through rendering based on 1 (original media stream) and b (non-media data such as user annotation data acquired by UE 1), and sends the AR media stream to the IMS AGW 2. The IMS AGW 2 finally obtains a media stream 1{b+c} (AR media stream) through rendering based on the received media stream and c (non-media data) of UE 2, and sends the AR media stream to the UE 2. As shown in FIG. 12C, if the IMS AGW 2 does not have the AR media processing capability, the IMS AGW 2 transfers c (the non-media data) of the UE2 to the IMS AGW 1 for media augmented processing.

With reference to a specific application scenario, the following describes a solution for augmenting a media stream through the auxiliary data channel.

For example, the user of the first terminal device shares a video with a user of the second terminal device. The user of the first terminal device and the user of the second terminal device can simultaneously watch the video shared by the first terminal device. In the following descriptions, for example, the AR media processing network element is the IMS AGW.

Figure 13:
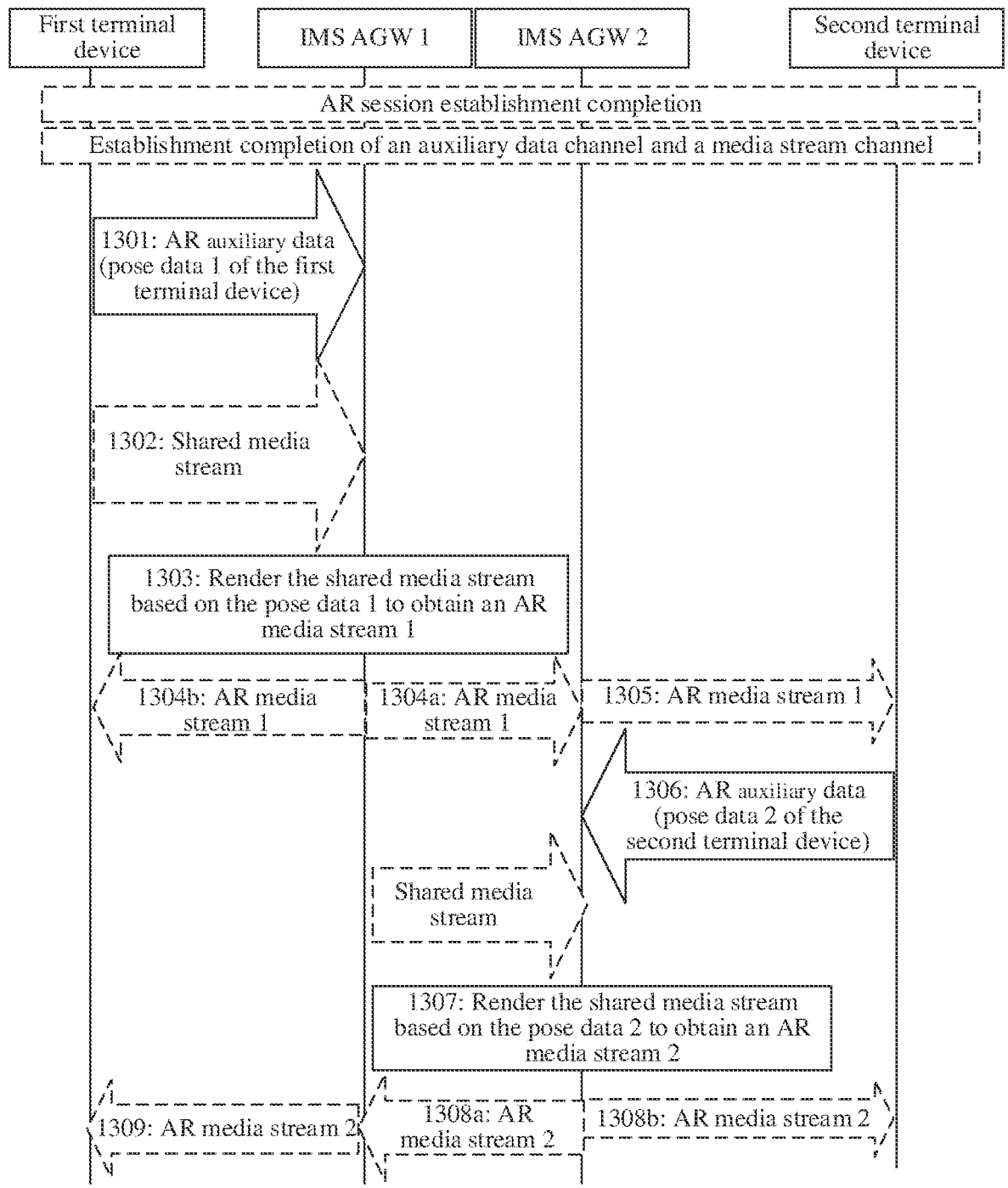
FIG. 13 is a schematic flowchart of another AR communication method according to an embodiment of this application.

Refer to FIG. 13. For example, both an IMS AGW 1 to which a first terminal device belongs and an IMS AGW 2 to which a second terminal device belongs have an AR processing capability. Establishment of an auxiliary data channel 1 has been completed between the first terminal device and the IMS AGW 1 to which the first terminal device belongs. Establishment of an auxiliary data channel 2 has been completed between the second terminal device and the IMS AGW 2 to which the second terminal device belongs. In addition, a media stream channel is established between the first terminal device and the second terminal device. It may be considered that the media stream channel is divided into three segments, which respectively include a media stream channel between the first terminal device and the IMS AGW 1, a media stream channel between the IMS AGW 1 and the IMS AGW 2, and a media stream channel between the IMS AGW 2 and the second terminal device. The first terminal device has the AR capability. For example, the first terminal device supports a user in annotating a shared picture. For ease of differentiation, a user of the first terminal device is referred to as a user 1, and a user of the second terminal device is referred to as a user 2.

1301: The first terminal device sends a media stream to the IMS AGW 1 through the media stream channel.

1302: The first terminal device obtains pose data 1 generated through annotation performed by the user 2 on a display interface corresponding to the media stream, and sends the pose data 1 as AR auxiliary data to the IMS AGW 1 through the auxiliary data channel 1.

1303: The IMS AGW 1 renders the media stream based on the pose data 1 to obtain an AR media stream 1.

1304a: The IMS AGW 1 sends the AR media stream 1 to the IMS AGW 2.

1304b: The IMS AGW 1 sends the AR media stream 1 to the first terminal device.

1305: The IMS AGW 2 sends the AR media stream 1 to the second terminal device through the media stream channel.

In this way, both the user 1 of the first terminal device and the user 2 of the second terminal device can watch the display interface on which the user 1 performs annotation.

In some embodiments, the second terminal device also has the AR capability. For example, the second terminal device supports a user in annotating a shared picture.

1306: The second terminal device obtains pose data 2 generated through annotation performed by the user 2 on the display interface corresponding to the media stream, and sends the pose data 2 as AR auxiliary data to the IMS AGW 2 through the auxiliary data channel 2.

1307: The IMS AGW 2 renders the media stream based on the pose data 2 to obtain an AR media stream 2.

1308a: The IMS AGW 2 sends the AR media stream 2 to the IMS AGW 1.

1308b: The IMS AGW 2 sends the AR media stream 2 to the second terminal device.

1309: The IMS AGW 1 sends the AR media stream 2 to the first terminal device through the media stream channel 1. In this way, both the user 1 of the first terminal device and the user 2 of the second terminal device can watch the display interface on which the user 2 performs annotation.

Figure 14:
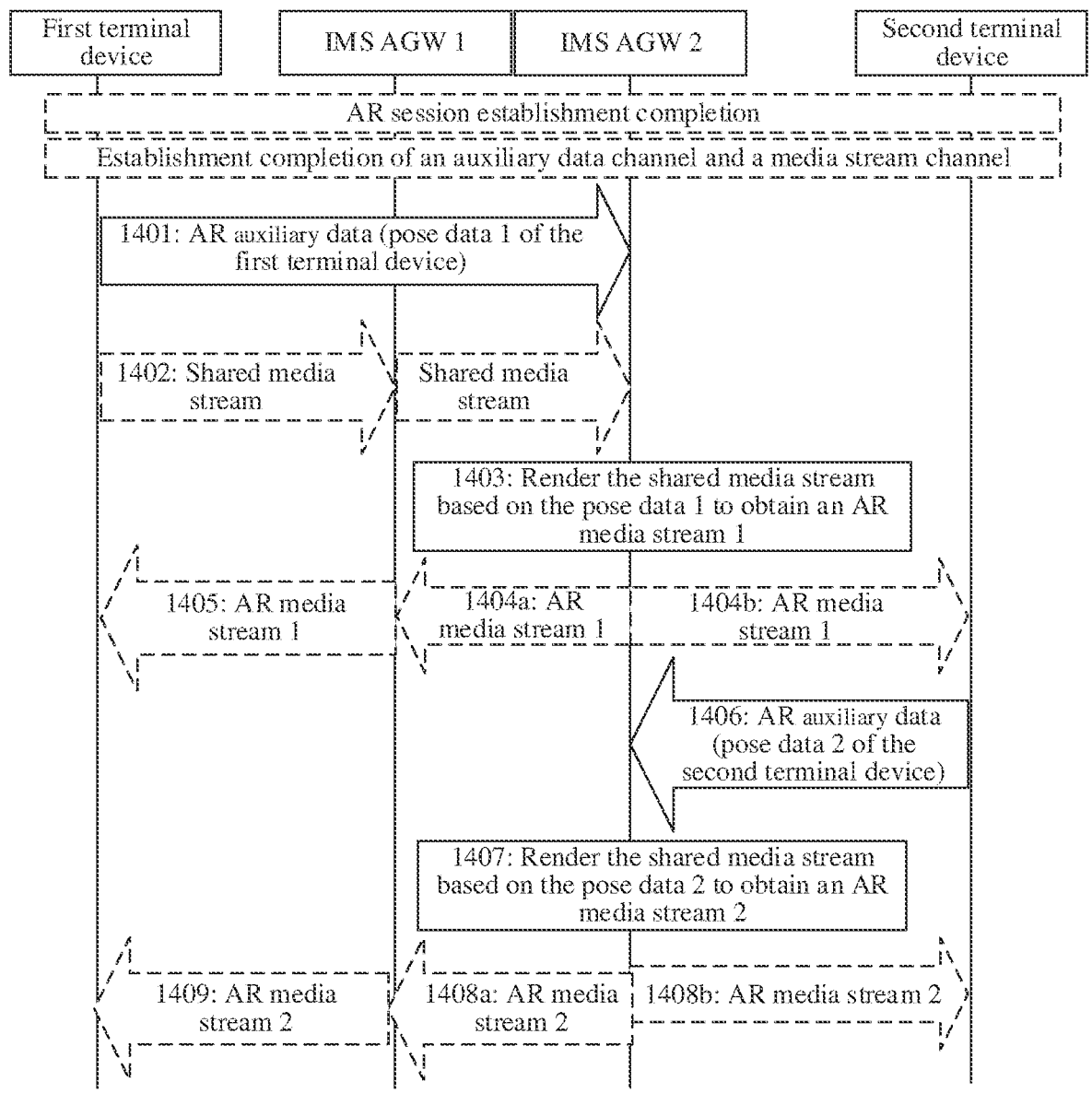
FIG. 14 is a schematic flowchart of another AR communication method according to an embodiment of this application.

Refer to FIG. 14. For example, an IMS AGW 1 to which a first terminal device belongs does not have an AR processing capability, and an IMS AGW 2 to which a second terminal device belongs has the AR processing capability. Establishment of an auxiliary data channel 1 has been completed between the first terminal device and the IMS AGW 2 to which the second terminal device belongs. Establishment of an auxiliary data channel 2 has been completed between the second terminal device and the IMS AGW 2 to which the second terminal device belongs. In addition, a media stream channel is established between the first terminal device and the second terminal device. It may be considered that the media stream channel is divided into three segments, which respectively include a media stream channel between the first terminal device and the IMS AGW 1, a media stream channel between the IMS AGW 1 and the IMS AGW 2, and a media stream channel between the IMS AGW 2 and the second terminal device. The first terminal device has the AR capability. For example, the first terminal device supports a user in annotating a shared picture. For ease of differentiation, a user of the first terminal device is referred to as a user 1, and a user of the second terminal device is referred to as a user 2.

1401: The first terminal device sends a media stream to the IMS AGW 1 through the media stream channel.

1402: The first terminal device obtains pose data 1 generated through annotation performed by the user 2 on a display interface corresponding to the media stream, and sends the pose data 1 as AR auxiliary data to the IMS AGW 2 through the auxiliary data channel 1.

1403: The IMS AGW 2 renders the media stream based on the pose data 1 to obtain an AR media stream 1.

1404a: The IMS AGW 2 sends the AR media stream 1 to the IMS AGW 1 through the media stream channel.

1405: The IMS AGW 1 sends the AR media stream 1 to the first terminal device through the media stream channel.

1404b: The IMS AGW 2 sends the AR media stream 1 to the second terminal device.

In this way, both the user 1 of the first terminal device and the user 2 of the second terminal device can watch the display interface on which the user 1 performs annotation.

In some embodiments, the second terminal device also has the AR capability. For example, the second terminal device supports a user in annotating a shared picture.

1406: The second terminal device obtains pose data 2 generated through annotation performed by the user 2 on the display interface corresponding to the media stream, and sends the pose data 2 as AR auxiliary data to the IMS AGW 2 through the auxiliary data channel 2.

1407: The IMS AGW 2 renders the media stream based on the pose data 2 to obtain an AR media stream 2.

1408a: The IMS AGW 2 sends the AR media stream 2 to the IMS AGW 1.

1408b: The IMS AGW 2 sends the AR media stream 2 to the second terminal device.

1409: The IMS AGW 1 sends the AR media stream 2 to the first terminal device through the media stream channel 1. In this way, both the user 1 of the first terminal device and the user 2 of the second terminal device can watch the display interface on which the user 2 performs annotation.

With reference to an embodiment, the following describes a procedure of obtaining a target object in this embodiment of this application.

Figure 15:
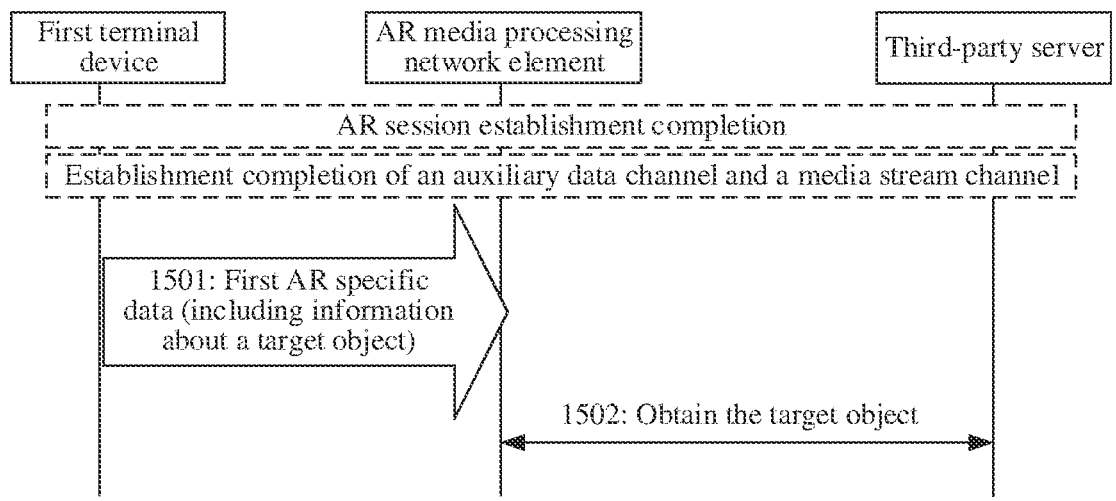
FIG. 15 is a schematic flowchart of another AR communication method according to an embodiment of this application.

FIG. 15 is a schematic flowchart of obtaining a possible target object according to an embodiment of this application.

1501: The first terminal device sends first AR auxiliary data to an AR media processing network element through an auxiliary data channel in a process of AR communication between a first terminal device and a second terminal device. The first AR auxiliary data includes information about a target object that needs to be used in the AR communication. The AR media processing network element mentioned herein is an IMS access gateway having an AR processing capability or an MRF. It may be understood that an auxiliary data channel is established between the AR media processing network element and the first terminal device. The AR media processing network element may be located in an IMS network to which the first terminal device belongs, namely, an IMS AGW or an MRF corresponding to the first terminal device. The AR media processing network element may be located in an IMS network to which the second terminal device belongs, namely, an IMS AGW or an MRF corresponding to the second terminal device.

1502: When receiving the first AR auxiliary data from the first terminal device through the auxiliary data channel, the AR media processing network element obtains the target object from a third-party server based on the first AR auxiliary data. It may be understood that the target object is used to augment a media stream for the AR communication between the first terminal device and the second terminal device.

For example, in some application scenarios, a virtual object, for example, a 2D/3D object, needs to be used, but the terminal device usually does not have a capability of storing a large quantity of 2D/3D objects. Therefore, in the foregoing manner, a requirement of a terminal device user may be received through the auxiliary data channel, and the 2D/3D object may be obtained from the third-party server.

For example, in some application scenarios, when a real background picture needed by a foreground object is relatively fixed, to reduce uplink bandwidth pressure on a terminal device side, the AR media processing network element may render a foreground picture and the background picture. In this case, the terminal device may send requirement information of the real background picture to the AR media processing network element through the auxiliary data channel, so that the AR media processing network element obtains the real background picture from the third-party server based on the requirement information, and further renders the real background picture and a foreground media stream sent by the terminal device and sends a media stream obtained by rendering the rendered background picture and the foreground media stream to the terminal device.

In a possible implementation, the AR media processing network element obtains address information of an AS in advance, and when obtaining a target object, the AR media processing network element obtains the target object from the third-party server via the AS. For a specific obtaining manner, refer to the foregoing descriptions. Details are not described herein again.

In another possible implementation, the AR media processing network element obtains address information of the third-party server in advance, so that when obtaining a target object, the AR media processing network element may directly obtain the target object from the third-party server based on the address information of the third-party server.

With reference to specific embodiments, the following describes a procedure of obtaining a virtual object. For details, refer to FIG. 16 and FIG. 17.

Figure 16:
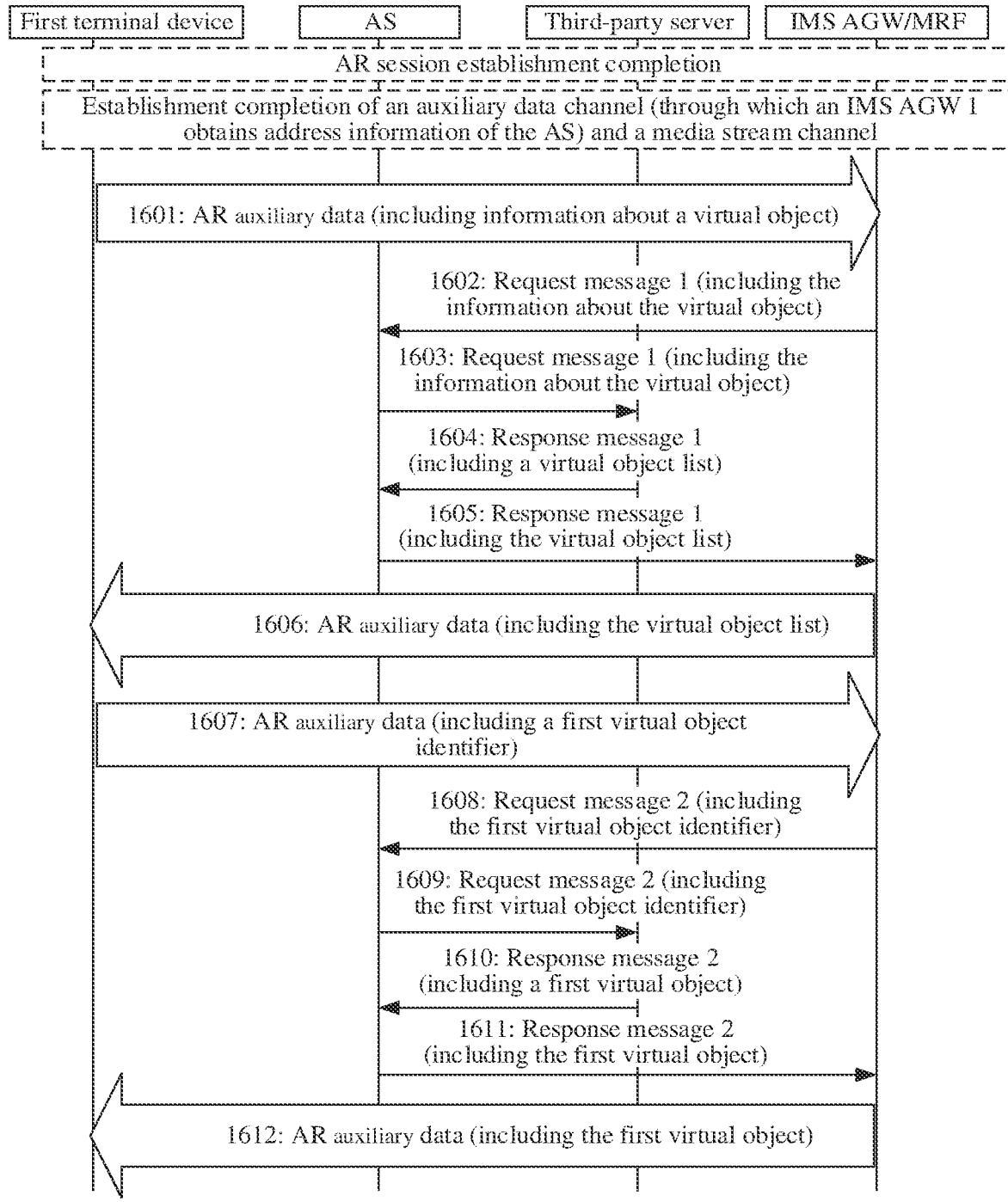
FIG. 16 is a schematic flowchart of another AR communication method according to an embodiment of this application.

Refer to FIG. 16. For example, an AR media processing network element obtains a virtual object from a third-party server via an AS. The AR media processing network element is an IMS AGW/MRF (IMS AGW/MRF). The IMS AGW may be an IMS AGW to which a first terminal device or a second terminal device at a communication peer belongs. The MRF may be an MRF to which a first terminal device or a second terminal device at a communication peer belongs.

1601: The first terminal device sends, to the IMS AGW/MRF through an auxiliary data channel, information about a virtual object, for example, an identifier of the virtual object or a type of the virtual object.

1602: When receiving the information about the virtual object, the IMS AGW/MRF sends a request message 1 to an application server, where the request message 1 includes the information about the virtual object. The type of the virtual object is used as an example. For example, the request message 1 may be of an HTTP message type. Certainly, another message type may alternatively be used. This is not limited in this application. For example, the request message 1 may be an HTTP request (req) message 1. For example, the request message 1 includes an identifier of a terminal device.

1603: The application server receives the request message 1, and when determining that the first terminal device needs to request the virtual object, forwards the request message 1 to the third-party server. For example, the application server may extract the identifier of the terminal device from the request message 1, and determine, based on the identifier of the terminal device, an identifier of a session established by the terminal device. The application server may establish, to the third-party server based on the identifier of the session, a communication connection, for example, an HI IP connection, so that the application server forwards the request message 1 to the third-party server, to obtain the virtual object from the third-party server. A session identifier of the first terminal device may be added to the request message 1 forwarded to the third-party server.

1604: The third-party server receives the request message 1, and obtains, based on the type of the virtual object, a plurality of virtual object identifiers that meet the type of the virtual object. An example in which a virtual object list includes the plurality of virtual object identifiers is used. Certainly, the plurality of virtual object identifiers may alternatively be sent in another form. This is not specifically limited in this application. The third-party server sends a response message 1 to the application server. The response message 1 may include the virtual object list. The response message 1 may be of an HTTP message type. For example, the response message 1 may be an HTTP response (resp) message 1. For example, the response message 1 includes a session identifier.

1605: The application server forwards the response message 1 to the IMS AGW/MRF. The application server determines the identifier of the terminal device based on the session identifier in the response message 1, and adds the identifier of the first terminal device to the response message 1 forwarded to the IMS AGW/MRF.

1606: The IMS AGW/MRF obtains the virtual object list from the response message 1 from the application server, and sends the virtual object list to the first terminal device through the auxiliary data channel. Optionally, after obtaining the virtual object list, the IMS AGW/MRF stores the virtual object list. Subsequently, when receiving virtual object information corresponding to the virtual object list through the auxiliary data channel, the IMS AGW/MRF may no longer obtain the virtual object list from the third-party server. It may be understood that, in step 1602, when it is determined that the IMS AGW/MRF stores the virtual object list corresponding to the virtual object information, the IMS AGW/MRF may no longer perform the subsequent step of obtaining the virtual object list.

1607: The first terminal device sends a first virtual object identifier to the IMS AGW/MRF through the auxiliary data channel. The first virtual object identifier is one in the virtual object list.

1608: When receiving the first virtual object identifier, the IMS AGW/MRF sends a request message 2 to the application server, where the request message 2 includes the first virtual object identifier. For example, the request message 2 may be of an HI IP message type. For example, the request message 2 may be an HTTP request (req) message 2.

1609: The application server receives the request message 2, and forwards the request message 2 to the third-party server.

1610: The third-party server receives the request message 2, and obtains a first virtual object corresponding to the first virtual object identifier. The third-party server sends a response message 2 to the application server. The response message 2 may include the first virtual object. The response message 2 may be of an HTTP message type. For example, the response message 2 may be an HTTP response (resp) message 2.

1611: The application server forwards the response message 2 to the IMS AGW/MRF.

1612: The IMS AGW/MRF obtains the first virtual object from the response message 2, and sends the first virtual object to the first terminal device through the auxiliary data channel.

Figure 17:
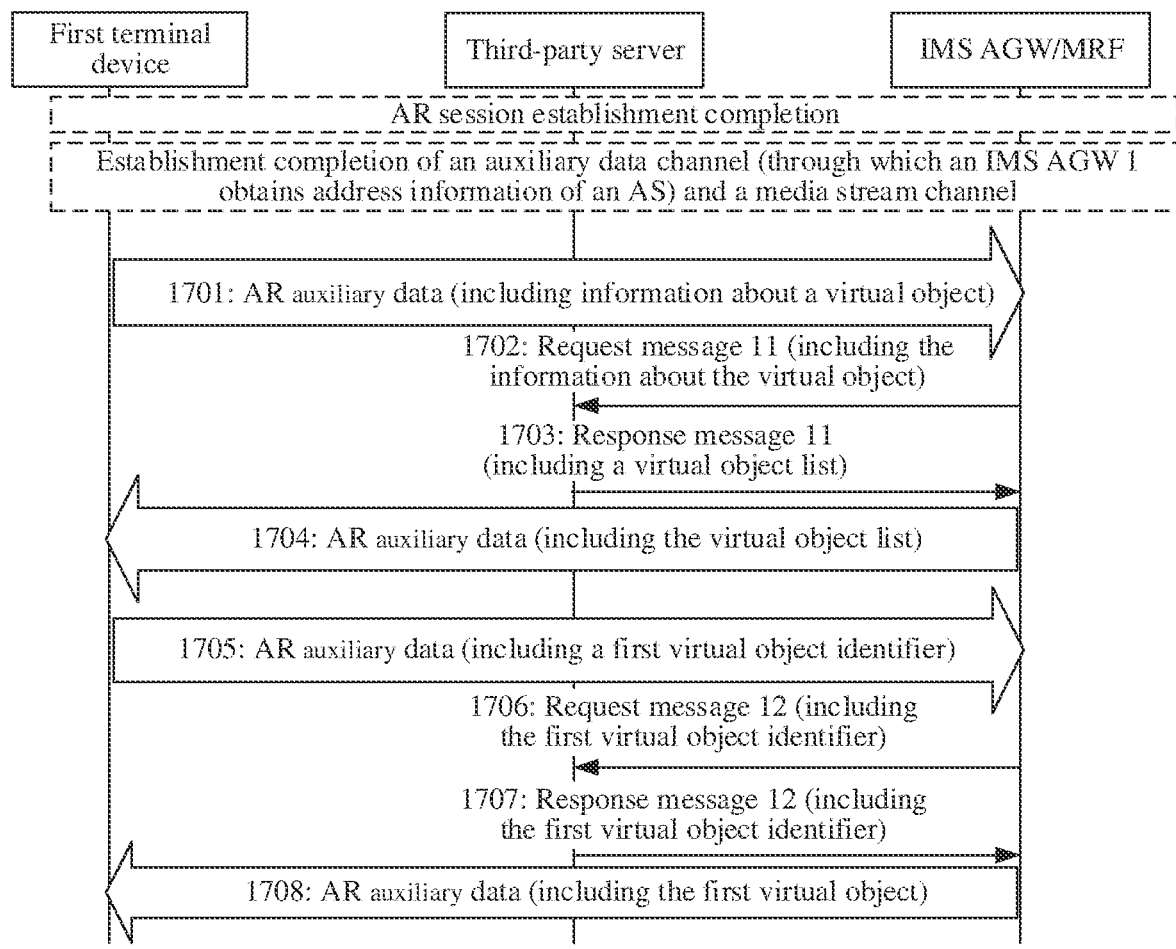
FIG. 17 is a schematic flowchart of another AR communication method according to an embodiment of this application.

Refer to FIG. 17. For example, an AR media processing network element directly obtains a virtual object from a third-party server. The AR media processing network element is an IMS AGW/MRF. The IMS AGW may be an IMS AGW to which a first terminal device or a second terminal device at a communication peer belongs. The MRF may be an MRF to which a first terminal device or a second terminal device at a communication peer belongs.

1701: The first terminal device sends, to the IMS AGW/MRF through an auxiliary data channel, information about a virtual object, for example, an identifier of the virtual object or a type of the virtual object.

1702: When receiving the information about the virtual object, the IMS AGW/MRF sends a request message 11 to the third-party server. The request message 11 may include the information about the virtual object.

1703: The third-party server receives the request message 11, and obtains, based on the type of the virtual object, a plurality of virtual object identifiers that meet the type of the virtual object. An example in which a virtual object list includes the plurality of virtual object identifiers is used. Certainly, the plurality of virtual object identifiers may alternatively be sent in another form. This is not specifically limited in this application. The third-party server sends a response message 11 to the IMS AGW/MRF. The response message 11 may include the virtual object list. The response message 11 may be of an HI IP message type. For example, the response message 11 may be an HTTP response (resp) message 11.

1704: The IMS AGW/MRF obtains the virtual object list from the response message 11, and sends the virtual object list to the first terminal device through the auxiliary data channel. Optionally, after obtaining the virtual object list, the IMS AGW/MRF stores the virtual object list. Subsequently, when receiving virtual object information corresponding to the virtual object list through the auxiliary data channel, the IMS AGW/MRF may no longer obtain the virtual object list from the third-party server. It may be understood that, in step 1702, when it is determined that the IMS AGW/MRF stores the virtual object list corresponding to the virtual object information, the IMS AGW/MRF may no longer perform the subsequent step of obtaining the virtual object list.

1705: The first terminal device sends a first virtual object identifier to the IMS AGW/MRF through the auxiliary data channel. The first virtual object identifier is one in the virtual object list.

1706: When receiving the first virtual object identifier, the IMS AGW/MRF sends a request message 12 to the third-party server.

1707: The third-party server receives the request message 12, and obtains a first virtual object corresponding to the first virtual object identifier. The third-party server sends a response message 12 to the IMS AGW/MRF. The response message 12 may include the first virtual object. The response message 12 may be of an HTTP message type. For example, the response message 12 may be an HTTP response (resp) message 12.

1708: The IMS AGW/MRF obtains the first virtual object from the response message 12, and sends the first virtual object to the first terminal device through the auxiliary data channel.

With reference to specific embodiments, the following describes a media augmented procedure of obtaining and using a real background object. For details, refer to FIG. 18 and FIG. 19.

Figure 18:
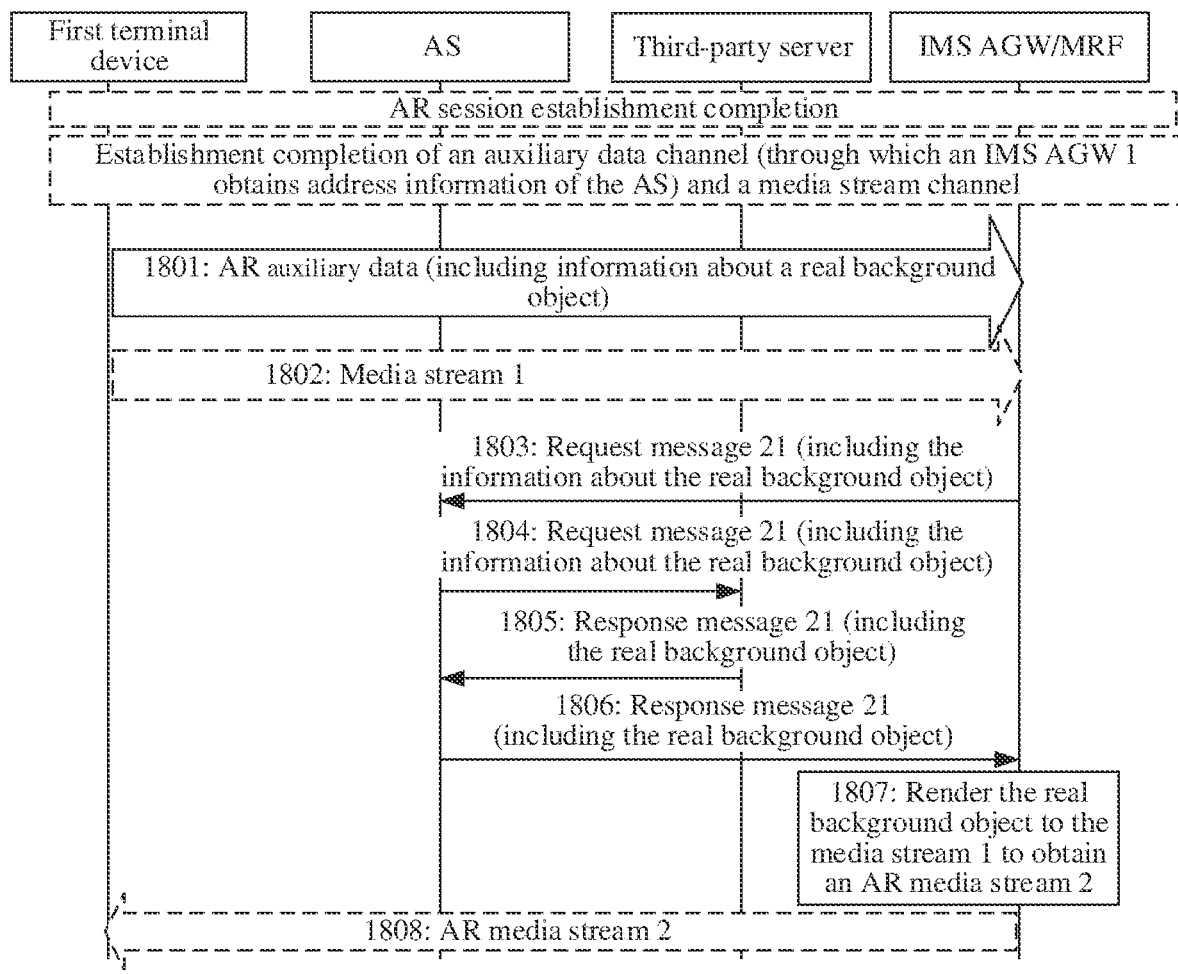
FIG. 18 is a schematic flowchart of another AR communication method according to an embodiment of this application.

Refer to FIG. 18. For example, an AR media processing network element obtains a real background object from a third-party server via an AS. The AR media processing network element is an IMS AGW/MRF. The IMS AGW may be an IMS AGW to which a first terminal device or a second terminal device at a communication peer belongs. The MRF may be an MRF to which a first terminal device or a second terminal device at a communication peer belongs.

1801: The first terminal device sends, to the IMS AGW/MRF through an auxiliary data channel, information about the real background object, for example, an identifier of the real background object or a geographical location of the real background object.

1802: The first terminal device sends a media stream 1 generated by the first terminal device to the IMS AGW/MRF through a media stream channel.

1803: When receiving the information about the real background object, the IMS AGW/MRF sends a request message 21 to the application server, where the request message 21 includes the information about the real background object. The geographical location of the real background object is used as an example. For example, the request message 21 may be of an HTTP message type. Certainly, another message type may alternatively be used. This is not limited in this application. For example, the request message 21 may be an HTTP request (req) message 21.

1804: The application server receives the request message 21, and when determining that the first terminal device needs to request the real background object, forwards the request message 21 to the third-party server.

1805: The third-party server receives the request message 21, and obtains the real background object based on the geographical location of the real background object. The third-party server sends a response message 21 to the application server. The response message 21 may include a real background object list. The response message 21 may be of an HTTP message type. For example, the response message 21 may be an HTTP response (resp) message 21.

1806: The application server forwards the response message 21 to the IMS AGW/MRF.

1807: The IMS AGW/MRF obtains the real background object from the response message 21, and renders the real background object to the media stream 1 to obtain an AR media stream 2.

1808: The IMS AGW/MRF sends the AR media stream 2 to the first terminal device through the media stream channel.

Figure 19:
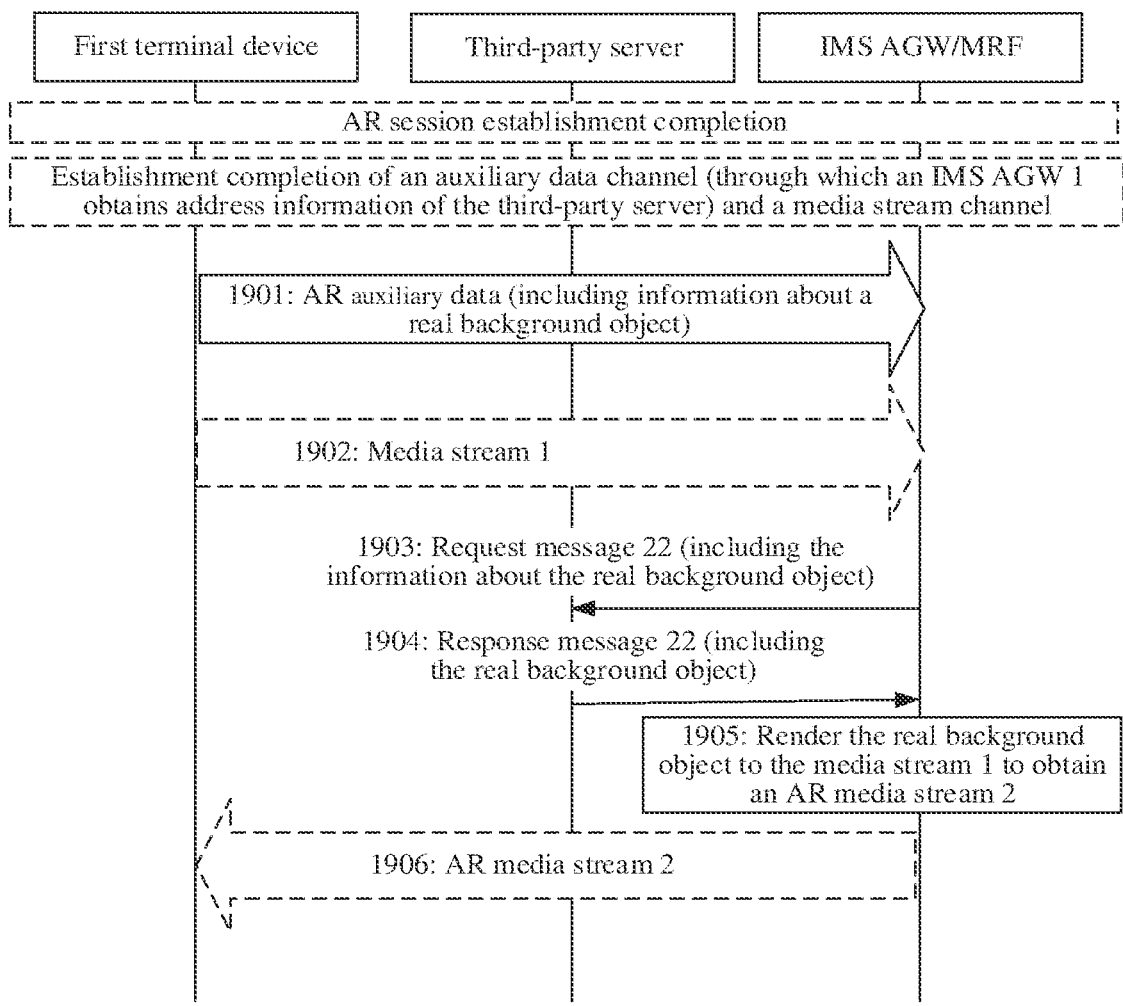
FIG. 19 is a schematic flowchart of another AR communication method according to an embodiment of this application.

Refer to FIG. 19. For example, an AR media processing network element directly obtains a real background object from a third-party server. The AR media processing network element is an IMS AGW/MRF. The IMS AGW may be an IMS AGW to which a first terminal device or a second terminal device at a communication peer belongs. The MRF may be an MRF to which a first terminal device or a second terminal device at a communication peer belongs.

1901: The first terminal device sends, to the IMS AGW/MRF through an auxiliary data channel, information about the real background object, for example, an identifier of the real background object or a geographical location of the real background object.

1902: The first terminal device sends a media stream 1 generated by the first terminal device to the IMS AGW/MRF through a media stream channel.

1903: When receiving the information about the real background object, the IMS AGW/MRF sends a request message 22 to the third-party server, where the request message 22 includes the information about the real background object. The geographical location of the real background object is used as an example. For example, the request message 22 may be of an HTTP message type. Certainly, another message type may alternatively be used. This is not limited in this application. For example, the request message 22 may be an HTTP request (request, req) message 22.

1904: The third-party server receives the request message 22, and obtains the real background object based on the geographical location of the real background object. The third-party server sends a response message 22 to the IMS AGW/MRF. The response message 22 may include a real background object list. The response message 22 may be of an HTTP message type. For example, the response message 22 may be an HTTP response (response) message 22.

1905: The IMS AGW/MRF obtains the real background object from the response message 22, and renders the real background object to the media stream 1 to obtain an AR media stream 2.

1906: The IMS AGW/MRF sends the AR media stream 2 to the first terminal device through the media stream channel.

Figure 20:
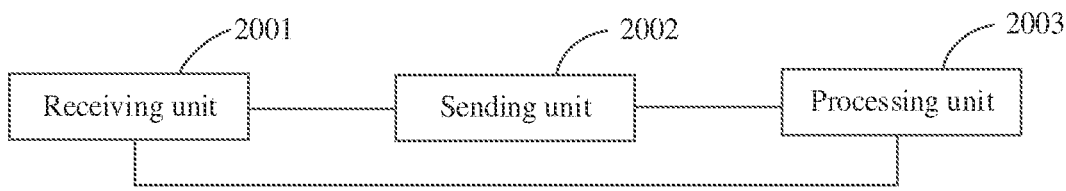
FIG. 20 is a schematic diagram of a structure of an apparatus according to an embodiment of this application.

Based on a same inventive concept as the method embodiments, an embodiment of this application provides an apparatus, specifically configured to implement the method performed by the IMS core network element in the foregoing method embodiments. A structure of the apparatus is shown in FIG. 20, and includes a receiving unit 2001, a sending unit 2002, and a processing unit 2003.

The receiving unit 2001 is configured to receive a first request message from a first terminal device, where the first request message is for requesting for establishing of an auxiliary data channel, and the auxiliary data channel is for transmitting auxiliary data for AR communication between the first terminal device and an AR media processing network element.

The processing unit 2003 is configured to control establishing of the auxiliary data channel between the AR media processing network element and the first terminal device.

In a possible implementation, the processing unit 2003 controls, via the receiving unit 2001 and the sending unit 2002, establishing of the auxiliary data channel between the AR media processing network element and the first terminal device.

The sending unit 2002 is configured to send a second request message to the AR media processing network element, where the second request message is for requesting for establishing of the auxiliary data channel between the AR media processing network element and the first terminal device.

The receiving unit 2001 is further configured to receive a second response message sent by the AR media processing network element, where the second response message indicates to the IMS core network element that the AR media processing network element agrees upon the establishing of the auxiliary data channel.

The sending unit 2002 is further configured to send a first response message to the first terminal device, where the first response message indicates to the first terminal device that the AR media processing network element is ready for establishing of the auxiliary data channel.

In a possible implementation, the AR media processing network element is an IMS access gateway having an AR processing capability or a media resource function MRF.

In a possible implementation, the AR media processing network element is located in an IMS network to which the first terminal device belongs or is located in an IMS network to which the second terminal device belongs.

In a possible implementation, the first request message and the second request message carry a first description parameter that is of the first terminal device and that is for establishing the auxiliary data channel.

The first response message and the second response message carry a second description parameter that is of the AR media processing network element and that is for establishing the auxiliary data channel.

In a possible implementation, the sending unit 2002 is further configured to send a query request to the AR media processing network element, where the query request is for querying whether the AR media processing network element has an AR processing capability.

The receiving unit 2001 is further configured to receive a query response sent by the AR media processing network element, where the query response carries information indicating that the AR media processing network element has the AR processing capability.

In a possible implementation, the first request message is further for requesting for establishing of a media stream channel, where the media stream channel is for transmitting a media stream for transmitting content for AR communication between the first terminal device and the AR media processing network element.

The processing unit 2003 is further configured to control establishing of the media stream channel between the AR media processing network element and the first terminal device.

In a possible implementation, the processing unit 2003 controls, via the sending unit 2002 and the receiving unit 2001, establishing of the media stream channel between the AR media processing network element and the first terminal device.

The sending unit 2002 is further configured to send a second request message to the AR media processing network element, where the second request message is for requesting for establishing of the media stream channel between the AR media processing network element and the first terminal device.

The receiving unit 2001 is further configured to receive a second response message sent by the AR media processing network element, where the second response message indicates to the IMS core network element that the AR media processing network element agrees upon the establishing of the media stream channel.

The sending unit 2002 is further configured to send a first response message to the first terminal device, where the first response message indicates to the first terminal device that the AR media processing network element is ready for establishing of the media stream channel.

Figure 21:
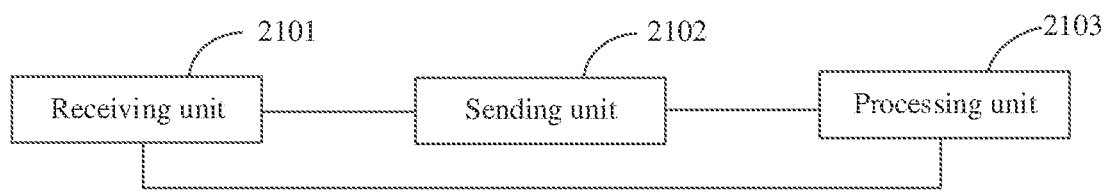
FIG. 21 is a schematic diagram of a structure of another apparatus according to an embodiment of this application.

Based on a same inventive concept as the method embodiments, an embodiment of this application provides an apparatus, specifically configured to implement the method performed by the AR media processing network element in the foregoing method embodiments. A structure of the apparatus is shown in FIG. 21, and includes a receiving unit 2101, a sending unit 2102, and a processing unit 2103.

The receiving unit 2101 is configured to receive a second request message sent by an internet protocol multimedia subsystem IMS core network element, where the second request message is for requesting for establishing of an auxiliary data channel between the AR media processing network element and a first terminal device, and the auxiliary data channel is for transmitting auxiliary data for AR communication between the first terminal device and the AR media processing network element.

The sending unit 2102 is configured to send a second response message to the IMS core network element, where the second response message indicates to the IMS core network element that the AR media processing network element agrees upon the establishing of the auxiliary data channel.

In a possible implementation, the receiving unit 2101 is specifically configured to receive AR auxiliary data from the first terminal device through the auxiliary data channel after the establishment of the auxiliary data channel is completed.

In a possible implementation, a media stream channel for transmitting content for AR communication is established between the AR media processing network element and the first terminal device.

In a possible implementation, the receiving unit 2101 is configured to receive a media stream for the AR communication from the first terminal device through the media stream channel.

The processing unit 2103 is configured to perform media augmented processing on the media stream for the AR communication based on the AR auxiliary data to obtain an AR media stream.

The sending unit 2102 is configured to send the AR media stream obtained through augmented processing to the first terminal device through the media stream channel.

In a possible implementation, the sending unit 2102 is further configured to send the AR media stream obtained through augmented processing to a second terminal device.

In a possible implementation, the AR auxiliary data includes one or more of operation data of a virtual model, annotation or tracking data of a target object, identification data of a facial expression or a body action, or pose data.

In a possible implementation, the AR media processing network element is an IMS access gateway having an AR processing capability or a media resource function MRF.

In a possible implementation, the AR media processing network element is located in an IMS network to which the first terminal device belongs or is located in an IMS network to which the second terminal device belongs.

In a possible implementation, the second request message carries a first description parameter that is of the first terminal device and that is for establishing the auxiliary data channel. The processing unit 2103 is specifically configured to determine, from the first description parameter, a second description parameter supported by the AR media processing network element, where the second response message carries the second description parameter.

Figure 22:
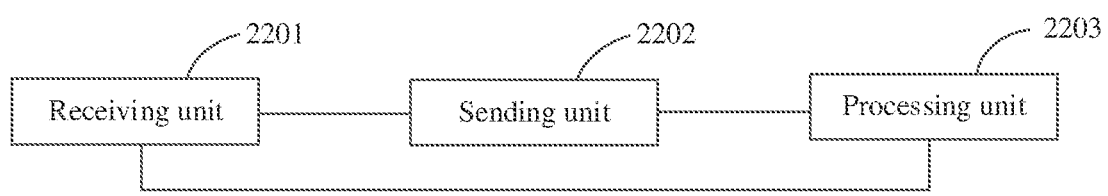
FIG. 22 is a schematic diagram of a structure of another apparatus according to an embodiment of this application.

Based on a same inventive concept as the method embodiments, an embodiment of this application provides an apparatus, specifically configured to implement the method performed by the terminal device in the foregoing method embodiments. A structure of the apparatus is shown in FIG. 22, and includes a receiving unit 2201, a sending unit 2202, and a processing unit 2203.

The sending unit 2202 sends a first request message to an IMS core network element, where the first request message is for requesting for establishing of an auxiliary data channel. The receiving unit 2201 receives a first response message sent by the IMS core network element, where the first response message indicates that the AR media processing network element completes the establishment of the auxiliary data channel, and the auxiliary data channel is for transmitting auxiliary data for AR communication between the first terminal device and the AR media processing network element.

A media stream channel for transmitting content for the AR communication is established between the first terminal device and the AR media processing network element.

In a possible implementation, the sending unit 2202 sends a third request message to the IMS core network element, where the third request message is for requesting for establishing of the media stream channel. The receiving unit 2201 receives a third response message sent by the IMS core network element, where the third response message indicates to the first terminal device that the AR media processing network element is ready for establishing of the media stream channel.

In a possible implementation, the first request message is further for requesting for establishing of the media stream channel. The first response message further indicates that the AR media processing network element is ready for establishing of the media stream channel.

In a possible implementation, the sending unit 2202 sends augmented reality AR auxiliary data to the AR media processing network element through the auxiliary data channel, and sends a media stream to the AR media processing network element through the media stream channel, where the media stream is generated during AR communication between the first terminal device and a second terminal device, where the AR auxiliary data is used by the AR media processing network element to perform media augmented processing on the media stream for the AR communication. The receiving unit 2201 receives an AR media stream obtained through augmented processing from the AR media processing network element through the media stream channel.

In a possible implementation, the receiving unit 2201 receives, through the media stream channel, an AR media stream that is of the second terminal device and that is sent by the AR media processing network element.

In a possible implementation, the first request message carries a first description parameter that is of the first terminal device and that is for establishing the auxiliary data channel.

The first response message carries a second description parameter that is of the AR media processing network element and that is for establishing the auxiliary data channel.

In a possible implementation, the AR media processing network element is located in an IMS network to which the first terminal device belongs or is located in an IMS network to which the second terminal device belongs.

In embodiments of this application, division into the units is an example and is merely logical function division, and may be other division during actual implementation. In addition, functional units in embodiments of this application may be integrated into one processor, may exist alone physically, or two or more units may be integrated into one unit. The foregoing integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a terminal device (which may be a personal computer, a mobile phone, a network device, or the like) or a processor to perform all or some of the steps of the methods in embodiments of this application. The foregoing storage medium includes: any medium that can store program code, such as a USB flash drive, a removable hard disk, a read-only memory (ROM), a random access memory (random access memory, RAM), a magnetic disk, or an optical disc.

In embodiments of this application, the AR media processing network element, the application server, the IMS core network element, and the terminal device may all be presented in a form of functional modules obtained through division in an integrated manner. The "module" herein may be an ASIC, a circuit, a processor executing one or more software or firmware programs, a memory, an integrated logic circuit, and/or another device that can provide the foregoing functions.

Figure 23:
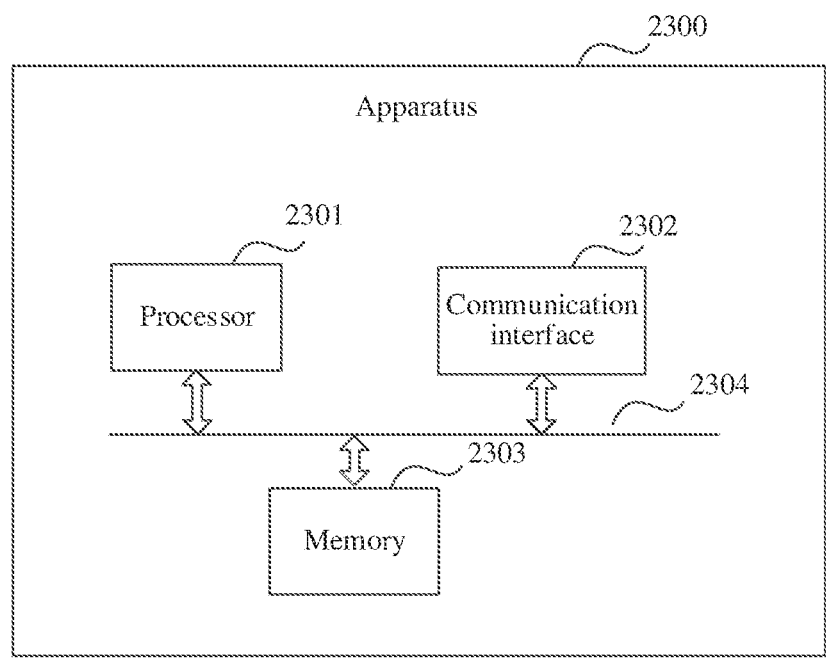
FIG. 23 is a schematic diagram of a structure of another apparatus according to an embodiment of this application.

In a simple embodiment, the AR media processing network element, the application server, the IMS core network element, and the terminal device may be implemented by using a structure shown in FIG. 23.

The apparatus 2300 shown in FIG. 23 includes at least one processor 2301 and a communication interface 2302, and optionally, may further include a memory 2303.

In a possible implementation, when the AR media processing network element is implemented by using the structure shown in FIG. 23, the processor 2301 in FIG. 23 may invoke computer-executable instructions stored in the memory 2303, so that the AR media processing network element may perform the method performed by the AR media processing network element in any one of the foregoing method embodiments.

The processor 2301 may communicate with another device via the communication interface 2302. For example, the processor 2301 receives, via the communication interface 2302, a request message sent by an IMS core network element, and sends a response message to the IMS core network element.

Specifically, the memory 2303 stores computer-executable instructions for implementing functions of the sending unit, the receiving unit, and the processing unit in FIG. 21. All functions/implementation processes of the sending unit, the receiving unit, and the processing unit in FIG. 21 may be implemented by the processor 2301 in FIG. 23 by invoking the computer-executable instructions stored in the memory 2303 and in combination with the communication interface 2302.

In still another possible implementation, when the IMS core network element is implemented by using the structure shown in FIG. 23, the processor 2301 in FIG. 23 may invoke the computer-executable instructions stored in the memory 2303, so that the IMS core network element may perform the method performed by the IMS core network element (the IMS AGW 1, the IMS AGW 2, the MRF 1, or the MRF 2) in any one of the foregoing method embodiments.

The processor 2301 may communicate with another device via the communication interface 2302. For example, the processor 2301 receives, via the communication interface 2302, a message sent by the AR media processing network element and a message sent to the AR media processing network element.

Specifically, the memory 2303 stores computer-executable instructions for implementing functions of the sending unit, the receiving unit, and the processing unit in FIG. 20. All functions/implementation processes of the sending unit, the receiving unit, and the processing unit in FIG. 20 may be implemented by the processor 2301 in FIG. 23 by invoking the computer-executable instructions stored in the memory 2303 and in combination with the communication interface 2302.

In still another possible implementation, when the terminal device is implemented by using the structure shown in FIG. 23, the processor 2301 in FIG. 23 may invoke computer-executable instructions stored in the memory 2303, so that the terminal device may perform the method performed by the first terminal device or the second terminal device in any one of the foregoing method embodiments.

The processor 2301 may communicate with another device via the communication interface 2302. For example, the processor 2301 receives, via the communication interface 2302, an augmented media stream and the like sent by the AR media processing network element, and sends AR auxiliary data, a media stream, and the like to the AR media processing network element.

Specifically, the memory 2303 stores computer-executable instructions for implementing functions of the sending unit, the receiving unit, and the processing unit in FIG. 22. All functions/implementation processes of the sending unit, the receiving unit, and the processing unit in FIG. 22 may be implemented by the processor 2301 in FIG. 23 by invoking the computer-executable instructions stored in the memory 2303 and in combination with the communication interface 2302.

A specific connection medium between the processor 2301 and the memory 2303 is not limited in this embodiment of this application. In this embodiment of this application, the memory 2303 is connected to the processor 2301 through a bus 2304 in the figure. The bus 2304 is represented by a thick line in the figure. A connection manner between other components is schematically described, and is not limited thereto. The bus 2304 may be classified into an address bus, a data bus, a control bus, and the like. For ease of representation, only one thick line is used to represent the bus in FIG. 23, but this does not mean that there is only one bus or only one type of bus.

Based on the foregoing embodiments, an embodiment of this application further provides a computer storage medium. The storage medium stores a software program. When the software program is read and executed by one or more processors, the method performed by a service platform or an edge computing device provided in any one or more of the foregoing embodiments may be implemented. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement a function of an AR media server or a function of the terminal device or the application server in any one or more of the foregoing embodiments. Optionally, the chip further includes a memory, and the memory is configured to store necessary program instructions and data that are executed by the processor. The chip may include a chip, or may include a chip and another discrete device.

It can be understood that "an embodiment", "an implementation", or "an example" mentioned in the entire specification means that particular features, structures, or characteristics related to embodiments are included in at least one embodiment of this application. Therefore, "in an embodiment", "in an implementation", or "in an example" appearing throughout the specification does not necessarily refer to a same embodiment. In addition, these particular features, structures, or characteristics may be combined in one or more embodiments in any proper manner. It can be understood that sequence numbers of the foregoing processes do not mean execution sequences in embodiments of this application. The execution sequences of the processes should be determined based on functions and internal logic of the processes, and should not constitute any limitation on the implementation processes of embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. The term "at least one" in this application means one or more, that is, includes one, two, three, or more; and the term "a plurality of" means two or more, that is, includes two, three, or more. In addition, it can be understood that in the descriptions of this application, the terms such as "first" and "second" are merely used for distinguishing and description, but cannot be understood as indicating or implying relative importance, or cannot be understood as indicating or implying a sequence. The term "at least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. It can be understood that in embodiments of this application, "B corresponding to A" indicates that B is associated with A, and B may be determined according to A. However, it can be further understood that determining B based on A does not mean that B is determined based only on A. B may alternatively be determined based on A and/or other information. In addition, the terms "include" and "have" in embodiments, claims, and accompanying drawings of this application are not exclusive. For example, a process, method, system, product, or device including a series of steps or modules is not limited to the enumerated steps or modules, and may further include a step or module that is not enumerated.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in the ASIC. In addition, the ASIC may be located in a network device or a terminal device. Certainly, the processor and the storage medium may exist in the network device or the terminal device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially executed. The computer may be a general-purpose computer, a dedicated computer, a computer network, or another programmable apparatus. The computer programs or the instructions may be stored in a computer-readable storage medium, or may be transmitted by using a computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state disk (solid-state disk, SSD).

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

What is claimed is:

1. A method, comprising:
    receiving, by an augmented reality (AR) media processing network element, AR auxiliary data from a first terminal through an auxiliary data channel established between the AR media processing network element and the first terminal;
    receiving, by the AR media processing network element, a media stream from the first terminal through a media stream channel established between the AR media processing network element and the first terminal;
    performing, by the AR media processing network element, media augmented processing on the media stream for AR communication based on the AR auxiliary data to obtain an AR media stream; and
sending, by the AR media processing network element, the AR media stream obtained through augmented processing to the first terminal through the media stream channel.

2. The method according to claim 1, further comprising:
before receiving the AR auxiliary data from the first terminal, receiving, by the AR media processing network element, a second request message sent by an internet protocol multimedia subsystem (IMS) core network element, wherein the second request message requests establishing of the auxiliary data channel; and
sending, by the AR media processing network element, a second response message to the IMS core network element, wherein the second response message indicates to the IMS core network element that the AR media processing network element agrees to the establishing of the auxiliary data channel.

3. The method according to claim 2, wherein the second request message carries a first description parameter that is of the first terminal and that is configured to be used for establishing the auxiliary data channel, and the method further comprises:
determining, by the AR media processing network element from the first description parameter, a second description parameter supported by the AR media processing network element, wherein the second response message carries the second description parameter.

4. The method according to claim 1, further comprising:
sending, by the AR media processing network element, the AR media stream obtained through augmented processing to a second terminal device.

5. The method according to claim 4, wherein the AR media processing network element is located in an IMS network to which the first terminal belongs or is located in an internet protocol multimedia subsystem (IMS) network to which the second terminal device belongs.

6. The method according to claim 1, wherein the AR auxiliary data comprises one or more of operation data of a virtual model, annotation or tracking data of a target object, identification data of a facial expression or a body action, or pose data.

7. The method according to claim 1, wherein the AR media processing network element is an IMS access gateway having an AR processing capability or a media resource function (MRF).

8. An apparatus, comprising:
at least one processor; and
a computer readable storage medium storing instructions for execution by the at least one processor, the instructions including instructions for:
receiving augmented reality (AR) auxiliary data from a first terminal through an auxiliary data channel established between an AR media processing network element and the first terminal;
receiving a media stream from the first terminal through a media stream channel established between the AR media processing network element and the first terminal;
performing media augmented processing on the media stream for AR communication based on the AR auxiliary data to obtain an AR media stream; and
sending the AR media stream obtained through augmented processing to the first terminal through the media stream channel.

9. The apparatus according to claim 8, wherein the instructions further include instructions for:
before receiving the AR auxiliary data from the first terminal, receiving, by the AR media processing network element, a second request message sent by an internet protocol multimedia subsystem (IMS) core network element, wherein the second request message requests establishing of the auxiliary data channel; and
sending a second response message to the IMS core network element, wherein the second response message indicates to the IMS core network element that the AR media processing network element agrees to the establishing of the auxiliary data channel.

10. The apparatus according to claim 9, wherein the second request message carries a first description parameter that is of the first terminal and that is configured to be used for establishing the auxiliary data channel, and the instructions further include instructions for:
determining, from the first description parameter, a second description parameter supported by the AR media processing network element, wherein the second response message carries the second description parameter.

11. The apparatus according to claim 8, wherein the instructions further include instructions for:
sending the AR media stream obtained through augmented processing to a second terminal device.

12. The apparatus according to claim 11, wherein the AR media processing network element is located in an IMS network to which the first terminal belongs or is located in an internet protocol multimedia subsystem (IMS) network to which the second terminal device belongs.

13. The apparatus according to claim 8, wherein the AR auxiliary data comprises one or more of operation data of a virtual model, annotation or tracking data of a target object, identification data of a facial expression or a body action, or pose data.

14. The apparatus according to claim 8, wherein the AR media processing network element is an IMS access gateway having an AR processing capability or a media resource function (MRF).

15. A system, comprising:
an augmented reality (AR) media processing network element; and
an internet protocol multimedia subsystem (IMS) core network element;
wherein the AR media processing network element is configured to:
receive AR auxiliary data from a first terminal through an auxiliary data channel established between the AR media processing network element and the first terminal;
receive a media stream from the first terminal through a media stream channel established between the AR media processing network element and the first terminal;
perform media augmented processing on the media stream for AR communication based on the AR auxiliary data to obtain an AR media stream; and
send the AR media stream obtained through augmented processing to the first terminal through the media stream channel.

16. The system according to claim 15, wherein the AR media processing network element is further configured to:
before receiving the AR auxiliary data from the first terminal, receive a second request message sent by the IMS core network element, wherein the second request message requests establishing of the auxiliary data channel; and send a second response message to the IMS core network element, wherein the second response message indicates to the IMS core network element that the AR media processing network element agrees to the establishing of the auxiliary data channel.

17. The system according to claim 16, wherein the second request message carries a first description parameter that is of the first terminal and that is configured to be used for establishing the auxiliary data channel; and wherein the AR media processing network element is further configured to determine, from the first description parameter, a second description parameter supported by the AR media processing network element, wherein the second response message carries the second description parameter.

18. The system according to claim 15, wherein the AR media processing network element is further configured to:
send the AR media stream obtained through augmented processing to a second terminal device.

19. The system according to claim 18, wherein the AR media processing network element is located in an IMS network to which the first terminal belongs or is located in an IMS network to which the second terminal device belongs.

20. The system according to claim 15, wherein the AR auxiliary data comprises one or more of operation data of a virtual model, annotation or tracking data of a target object, identification data of a facial expression or a body action, or pose data.

21. The system according to claim 15, wherein the AR media processing network element is an IMS access gateway having an AR processing capability or a media resource function (MRF).

* * * * *